United States Patent
Wu et al.

(10) Patent No.: US 12,289,730 B2
(45) Date of Patent: Apr. 29, 2025

(54) RESOURCE ALLOCATION IN UNLICENSED BANDWIDTH PART

(71) Applicant: GOOGLE LLC, Mountain View, CA (US)

(72) Inventors: Chih-Hsiang Wu, Taoyuan (TW); Kao-Peng Chou, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 611 days.

(21) Appl. No.: 17/416,439

(22) PCT Filed: Dec. 17, 2019

(86) PCT No.: PCT/US2019/066878
§ 371 (c)(1),
(2) Date: Jun. 18, 2021

(87) PCT Pub. No.: WO2020/131886
PCT Pub. Date: Jun. 25, 2020

(65) Prior Publication Data
US 2022/0078834 A1    Mar. 10, 2022

Related U.S. Application Data

(60) Provisional application No. 62/781,592, filed on Dec. 18, 2018.

(51) Int. Cl.
*H04W 72/232*    (2023.01)
*H04L 5/00*    (2006.01)
(Continued)

(52) U.S. Cl.
CPC ........... *H04W 72/23* (2023.01); *H04L 5/0053* (2013.01); *H04L 5/0092* (2013.01);
(Continued)

(58) Field of Classification Search
None
See application file for complete search history.

(56) References Cited

U.S. PATENT DOCUMENTS

| 2018/0183551 A1 | 6/2018 | Chou et al. |
| 2018/0192383 A1 | 7/2018 | Nam et al. |

(Continued)

FOREIGN PATENT DOCUMENTS

| CN | 107431588 A | 12/2017 |
| CN | 107453840 A | 12/2017 |

(Continued)

OTHER PUBLICATIONS

First Examination Report for India Application No. 202147028559, dated Mar. 14, 2022.
(Continued)

*Primary Examiner* — Duc T Duong
(74) *Attorney, Agent, or Firm* — MARSHALL, GERSTEIN & BORUN LLP

(57) ABSTRACT

Allocating resources to user devices in a base station includes transmitting, to a user device, indications of a first time-frequency resource including a first frequency sub-band within a bandwidth part allocated in an unlicensed spectrum and a second time-frequency resource including a second frequency sub-band within the bandwidth part, performing a channel access procedure on the first channel corresponding to the first frequency sub-band, and a second channel corresponding to the second frequency sub-band, to obtain channel occupancy time on at least one of the first channel or the second channel; and transmitting, within the obtained channel occupancy time on at least one of the first channel or the second channel, downlink control information to a user device over a first time-frequency resource that includes the first frequency sub-band or a second time-
(Continued)

frequency resource that includes the second frequency subband.

20 Claims, 17 Drawing Sheets

(51) Int. Cl.
| | | |
|---|---|---|
| *H04L 27/00* | (2006.01) | |
| *H04W 72/044* | (2023.01) | |
| *H04W 72/23* | (2023.01) | |
| *H04W 74/00* | (2009.01) | |

(52) U.S. Cl.
CPC ........ *H04L 5/0094* (2013.01); *H04L 27/0006* (2013.01); *H04W 72/044* (2013.01); *H04W 74/006* (2013.01); *H04L 5/001* (2013.01)

(56) References Cited

U.S. PATENT DOCUMENTS

| | | | |
|---|---|---|---|
| 2018/0199343 A1 | 7/2018 | Deogun et al. | |
| 2018/0343154 A1 | 11/2018 | Park et al. | |
| 2019/0045533 A1* | 2/2019 | Chatterjee | H04L 5/0053 |
| 2019/0268883 A1* | 8/2019 | Zhang | H04L 5/0094 |
| 2020/0053775 A1* | 2/2020 | Lee | H04W 74/0808 |
| 2020/0196285 A1* | 6/2020 | Zhuang | H04W 72/04 |
| 2020/0275484 A1* | 8/2020 | Xu | H04W 72/0453 |
| 2021/0092622 A1* | 3/2021 | Tiirola | H04L 1/0038 |
| 2021/0153205 A1* | 5/2021 | Takeda | H04W 72/23 |
| 2021/0227568 A1* | 7/2021 | Harada | H04L 5/0048 |
| 2021/0235491 A1* | 7/2021 | Iyer | H04W 72/23 |
| 2021/0235492 A1* | 7/2021 | Iyer | H04W 72/23 |
| 2021/0250923 A1* | 8/2021 | Liu | H04W 72/0453 |
| 2021/0410186 A1* | 12/2021 | Hajir | H04W 74/0816 |
| 2022/0039158 A1* | 2/2022 | Awadin | H04W 74/0866 |

FOREIGN PATENT DOCUMENTS

| | | |
|---|---|---|
| CN | 108112080 A | 6/2018 |
| CN | 108496397 A | 9/2018 |
| CN | 108781200 A | 11/2018 |
| CN | 110476388 A | 11/2019 |
| WO | WO-2018/031327 A1 | 2/2018 |
| WO | WO-2018/194352 A1 | 10/2018 |
| WO | WO-2018/203650 A1 | 11/2018 |

OTHER PUBLICATIONS

International Search Report and Written Opinion for Application No. PCT/US2019/066878, dated Mar. 17, 2020.
Motorola Mobility et al., "Feature Lead Summary for NR-U DL Signals and Channels," 3GPP Draft; R1-1809791, 3rd Generation Partnership Project (2018).
Nokia et al., "On the Frame Structure and Wideband Operation for NR-U," 3GPP Draft; R1-1812697 Frame Structure and WB Operation NOK (2018).
Vivo, "Potential Solutions and Techniques for NR Unlicensed Spectrum," 3GPP Draft; R1-1801557, 3rd Generation Partnership Project (2018).
First Office Action for Chinese Application No. 2019800292289.5, dated Sep. 29, 2023.
Huawei, "Summary of remaining issues on bandwidth part and wideband operation", 3GPP TSG RAN WG1; R1-1801347 (2018).
Office Action for European Application No. 19839517.0, dated Dec. 19, 2023.
"3rd Generation Partnership Project; Technical Specification Group Radio Access Network; LTE Advanced inter-band Carrier Aggregation (CA) (3DL/3UL) (Release 13)," 3GPP TR 36.899-13 (2016).
Lagen et al., "New Radio Beam-Based Access to Unlicensed Spectrum: Design Challenges and Solutions," IEEE (2018).
Qualcomm Incorporated, "DL signals and channels for NR-U," 3GPP TSG RAN WG1 Meeting #94bis (2018).

* cited by examiner

RESOURCE ALLOCATION IN UNLICENSED BANDWIDTH PART

FIELD OF THE DISCLOSURE

This disclosure relates to wireless communications and, more particularly, to allocating resources for wireless communications in an unlicensed portion of the spectrum.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some cases, base stations and user devices operating in wireless communication networks can utilize portions of both licensed and unlicensed radio spectrum. 5G New Radio (NR), for example, supports operations in the unlicensed spectrum, commonly referred to as NR-U. One of the requirements of NR-U is co-existence with other radio access technology such as WiFi® (IEEE 802.11).

Because base stations cannot rely on persistent scheduling of time-frequency resources in the unlicensed spectrum, base stations implement a channel access procedure to determine whether a certain channel is idle, prior to transmitting. The channel access procedure can be for example the so-called listen-before-talk (LBT) procedure, which is defined as a mechanism by which a device applies a clear channel assessment (CCA) check before using the channel. The CCA in turn utilizes the least-energy detection to determine the presence or absence of other signals on a channel in order to determine whether the channel is occupied or clear (idle).

In some situations, performing the LBT procedure prevents base stations from using channels that are actually available. For example, a 5G NR base station can configure a user device to operate within a certain bandwidth part (BWP), or a portion of a wide carrier bandwidth. The specification 3GPP TS 38.211 defines a BWP as a contiguous set of physical resource blocks on a given carrier. As a more specific example, the full carrier bandwidth may be 80 MHZ, and the user device can be capable of a maximum carrier bandwidth of 20 MHZ, and a base station accordingly can configure a 20 MHz BWP for the user device. As another specific example, the full carrier bandwidth may be 200 MHZ, the user device may be capable of a maximum carrier bandwidth of 100 MHZ, and the base station accordingly can configure a BWP of 100 MHz for the user device. Although multiple devices can use respective sub-bands of the BWP concurrently, 5G NR transmissions, or transmissions according to other RATs (e.g., WiFi, Bluetooth®, LTE licensed assisted access (LAA), LTE-unlicensed), in some cases can produce so much energy (or power) on a sub-band that the base station determines that the detected energy on the BWP is above a certain threshold level. As a result, the base station does not transmit in any of the other sub-bands of the BWP, thus wasting a transmission opportunity. More particularly, the base station can fail to transmit downlink control information (DCI) to a user device in one of time-frequency resources, referred to as control resource sets (CORESETs).

Further, a 5G NR base station in another scenario broadcasts a master information block (MIB) on a physical broadcast channel (PBCH) of a certain cell. The MIB can contain a single-CORESET configuration (a controlResourceSetZero element) for the user device. Using this single-CORESET configuration, the user device can receive system information (e.g., system information blocks other than the MIB). The user device performs blind decoding of the CORESET in this single-CORESET configuration using its radio network temporary identifier (RNTI) in an attempt to receive a DCI. To transmit the DCI, the base station performs the LBT procedure on a channel corresponding to the frequency of the CORESET and transmits the system information according to the DCI only if the channel is idle. When the base station determines that the channel is busy, the base station can continue performing the LBT procedure on this channel, but because the configuration includes only one CORESET, the base station does not have other opportunities to transmit a DCI.

Thus, the base station in the scenarios above fails to transmit a DCI to a user device in a suitable CORESET. Without the user device successfully obtaining a DCI, the base station cannot schedule downlink or uplink transmissions for the user device.

SUMMARY

A base station of this disclosure can configure a user device to operate within a certain BWP, and configure the user device with a set of CORESETs. For example, a resource grid can correspond to the BWP conceptually divided into several sub-bands along the frequency axis and the time slot divided into several OFDM symbols along the time axis. In this grid, the base station can allocate several CORESETs, some or all of which may be overlapping. In another implementation, none of the CORESETs in the grid are overlapping.

In order to then transmit a DCI to the user device, the base station can perform the LBT procedure (or another suitable channel access procedure) on the channel corresponding to the frequency sub-band of one CORESET as well as on the channel corresponding to the frequency sub-band of another CORESET. Depending on the scenario or implementation, the base station can perform LBT on these two (or more) channels concurrently or sequentially. When the result of the LBT procedure indicates that one channel is occupied but another channel is idle, the base station uses the CORESET corresponding to the idle channel to transmit the DCI.

In some implementations, the base station can use a wake-up signal (WUS) to notify the user device that a DCI is to be transmitted in a certain CORESET, a subset of CORESETs, or generally in the time slot in accordance with the previously provided configuration. Further, the base station in some implementations configures some CORESETs to be primary or secondary, where the user device performs blind decoding on a secondary CORESET only after failing to detect the DCI in every primary CORESET. Still further, the base station in some implementations assigns priorities to the CORESETs, and user devices perform blind decoding on the CORESETs in accordance with the priorities. The base station in some cases also uses the priorities to select a CORESET for transmission from among several candidates.

A user device of this disclosure accordingly can receive a configuration that specifies multiple CORESETs and perform blind decoding to detect a DCI. The user device can perform blind decoding and CORESET selection in accordance with the assigned priorities, primary/secondary designations, etc. Further, the user device in some cases can process CORESETs upon detecting a WUS on a particular channel or a set of channels.

One example embodiment of these techniques is a method in a base station for allocating resources to user devices. The method includes transmitting, to a user device, indications of (i) a first time-frequency resource including a first frequency sub-band within a bandwidth part allocated in an unlicensed spectrum and (ii) a second time-frequency resource including a second frequency sub-band within the bandwidth part. The method also includes performing, by processing hardware, a channel access procedure on (i) a first channel corresponding to the first frequency sub-band, and (ii) a second channel corresponding to the second frequency sub-band, to obtain channel occupancy time on at least one of the first channel or the second channel. The bandwidth part should be within a frequency sub-band identified by a sub-band number, which 3GPP specifications define. It is noted that the frequency sub-bands within the bandwidth part discussed in this disclosure do not refer to frequency sub-bands identified by sub-band numbers defined by the 3GPP specifications. The method further includes transmitting, by the processing hardware within the obtained channel occupancy time on at least one of the first channel or the second channel, downlink control information (DCI) to a user device over a first time-frequency resource that includes a carrier frequency in the first frequency sub-band and/or a second time-frequency resource that includes a carrier frequency in the second frequency sub-band. The user device is configured with the first time-frequency resource and the second time-frequency resource.

Another embodiment of these techniques is a base station comprising processing hardware configured to implement the method above.

Yet another embodiment of these techniques is method in a user device for obtaining resources in an unlicensed spectrum. The method includes obtaining, by processing hardware, a configuration that specifies a plurality of time-frequency resources and respective priorities, each of the time-frequency resources including a respective frequency sub-band within a bandwidth part allocated in an unlicensed spectrum; performing, by the processing hardware, blind decoding in the bandwidth part in accordance with the configuration to detect downlink control information (DCI); and communicating with a base station in accordance with the detected DCI.

Still another embodiment of these techniques is a user device comprising processing hardware configured to implement the method above.

DETAILED DESCRIPTION OF THE DRAWINGS

Figure 1:
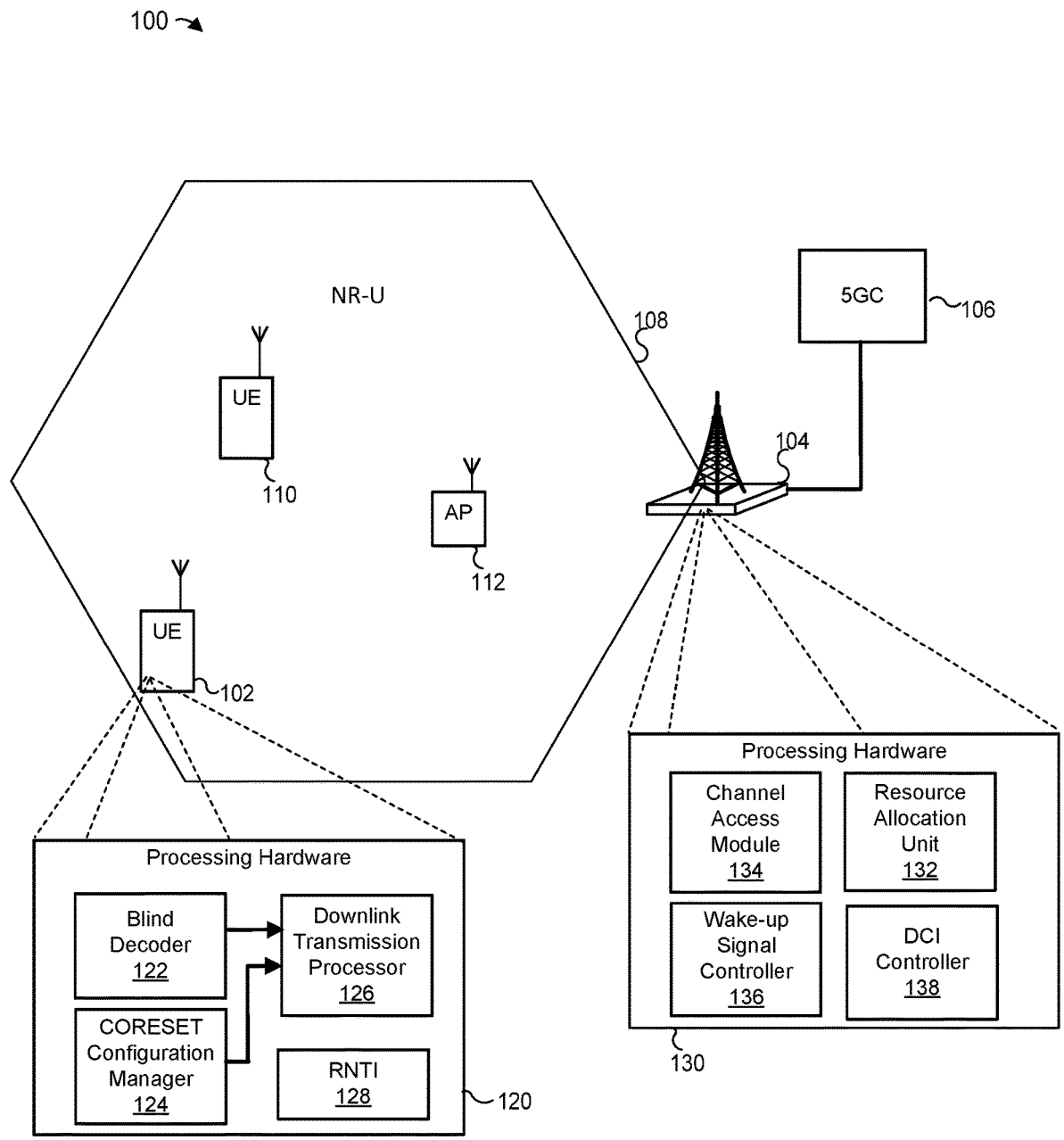
FIG. 1 is a block diagram of an example wireless communication network in which a base station and a user device can utilize resources in the unlicensed spectrum in accordance with the techniques of this disclosure.

FIG. 1 depicts an example wireless communication network 100 in which devices such as base stations and user devices (also referred to user equipment, or UEs) communicate using unlicensed portions of the radio spectrum. Because the examples below refer primarily to 5G NR technologies, these unlicensed portions of the radio spectrum are referred to as NR-U.

The wireless communication network 100 in an example configuration includes a UE 102, which can be any suitable device capable of wireless communications (as further discussed below). The wireless communication network 100 further includes a 5G NR base station 104 connected to a core network (CN) 106 of CN type 5GC. The 5G NR base station 104 accordingly operates as a next-generation Node B (gNB). In other implementations, however, the wireless communication network 100 can include one or more base stations that operate according to radio access technologies (RATs) of types other than NR, and these base stations can be connected to CNs of other CN types, or operated in a standalone mode without a connection to any CN.

The base station 104 covers a 5G NR cell 108 in which UEs can utilize the NR-U as well as portions of the radio spectrum allocated specifically to the service provider that operates the base station 104 and the core network 106. When receiving data from, and transmitting data to, the base station 104 using the 5G NR air interface, the UE 102 may share the NR-U with other devices. For example, a UE 110 can be a subscriber of the service provider that operates the base station 104 and the core network 106, and thus can communicate with the base station 104. In another scenario, the UE 110 is a subscriber of another service provider that supports the NR-U and communicates with a base station other than the base station 104 (not shown to avoid clutter). In this scenario, a user operates the base station 104 and connects the base station 104 to a data network of an Internet service provider (ISP). The base station 104 in this case operates similar to a WiFi access point (AP) but utilizes the NR-U instead of one of IEEE 802.11 standards to communicate with the UEs. Further, an AP 112 can utilize portions of the radio spectrum as the NR-U when operating in a wireless local area network (WLAN) according to one of IEEE 802.11 standards.

In general, the wireless communication network 100 can include any number of base stations, and each of the base stations can cover one, two, three, or any other suitable number of cells.

The UE 102 is equipped with processing hardware 120 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware 120 in an example implementation includes a blind decoder 122, a CORESET configuration manager 124, and a downlink transmission processor 126. The memory of the processing hardware 120 also can store an RNTI 128 of the UE 102. The RNTI can be for example a cell RNTI (C-RNTI), a random access RNTI (RA-RNTI), a system information RNTI (SI-RNTI), a paging RNTI (P-RNTI), a configured scheduling RNTI (CS-RNTI), etc.

Processing hardware 130 of the base station 104 also can include one or more general-purpose processors such as CPUs and a non-transitory computer-readable memory storing instructions that the one or more general-purpose processors execute. Additionally or alternatively, the processing hardware 130 can include special-purpose processing units. The processing hardware in an example implementation includes a resource allocation unit 132, a channel access module 134, a wake-up single controller 136, and a DCI controller 138. In other implementations, the processing hardware 130 includes only some of the units 132-138.

In operation, the resource allocation unit 132 allocates a BWP and CORESET configuration to one or more UEs including the UE 102. Using the BWP and CORESET information, the UE 102 can find a Physical Downlink Channel (PDCCH) on which the base station 130 transmits a DCI for the UE 102. More generally, the base station transmits control information in the downlink direction of a PDCCH (e.g., information for switching a UE to an active BWP, initiation of a random access procedure, notification of a time slot format, activation of one or more BWPs for a UE). The UE 102 can attempt to decode the PDCCH using the RNTI 128. The base station 104 may transmit to the UE 102 one or more RRC messages to configure one or more BWPs. In some implementations, the base station 104 transmits to the UE 102 one or more Medium Access Control (MAC) protocol data units (PDUs) instead of the control information in the PDCCH to activate the one or more BWPs. The one or more MAC PDUs may include one or more MAC control elements or one or more RRC messages.

Figure 2:
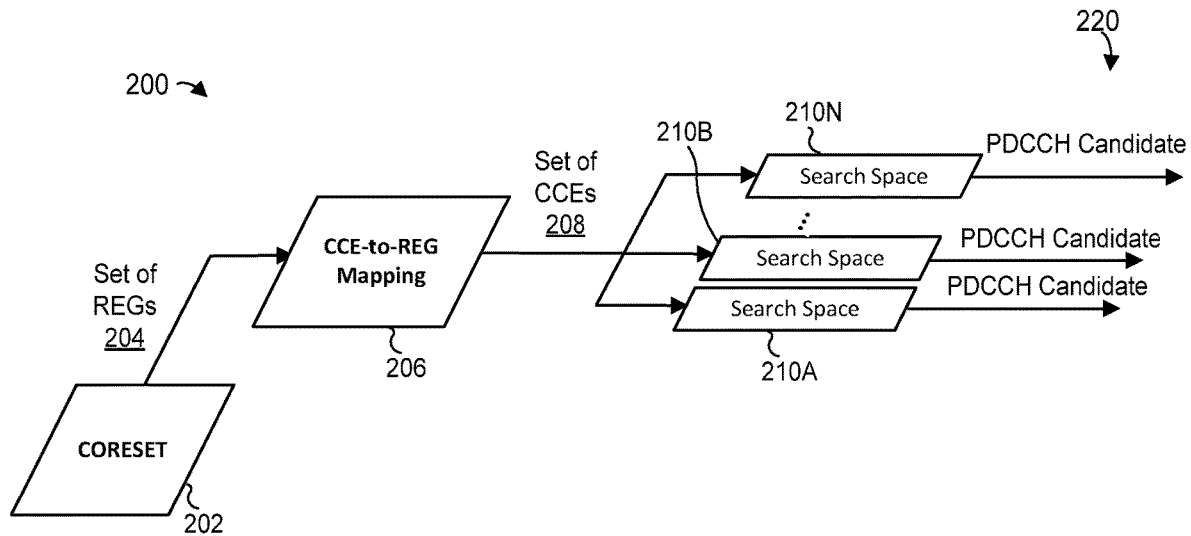
FIG. 2 is a block diagram illustrating a mapping of a CORESET to search spaces for identifying channel candidates.

For clarity, FIG. 2 illustrates how an example CORESET 202 maps to search spaces for identifying channel candidates. Generally speaking, a CORESET is an example of a time-frequency resource in which a base station can transmit one or more DCI to one or more UEs. At least because NR supports a configurable bandwidth within which a UE can operate, a CORESET is limited both in time and in frequency of the configurable bandwidth so as to avoid using a control region that occupies the entire bandwidth, which is larger than a maximum bandwidth which the UE can support.

The CORESET 202 provides a set (or "bundle") 204 of resource element groups (REGs), where one REG is one physical resource block (PRB) during one OFDM symbol. A CCE can be made up of L REGs, where L is the bundle size, and the CORESET 202 includes a field specifying the value of L. The CCE-to-REG mapping 206 can provide a set 208 of control channel elements (CCEs) based on the set of REGs, in accordance with one of mapping methods supported in the wireless communication network 100. The set 208 of CCEs in turn specifies a set of search spaces 210A, 210B . . . 210N corresponding to PDCCH candidates 220.

Referring back to FIG. 1, the UE 102 can use the CORESET 202 to find a PDCCH for the UE 102 among the PDCCH candidates 220 using blind decoding, and identify the correct PDCCH using the RNTI 128. In particular, the base station 104 encrypts each DCI with a certain RNTI, and the UE 102 can successfully decode the DCI when the UE 102 has the correct RNTI. As schematically illustrated in FIG. 2, the base station 104 can configure the UE 102 with multiple and, in some cases, overlapping CORESETs within the active BWP.

The channel access module 134 of the base station 104 can implement an LBT procedure, or another suitable channel access or channel sensing procedure, to determine whether another device currently is occupying the channel. When the channel access module 134 determines that no other device is occupying the channel, the channel access module 134 can obtain channel occupancy time (COT) to transmit signals on the channel. As a more specific example, the channel access module 134 can apply a clear assessment check (CCA) procedure, which is based on least-energy detection to determine presence or absence of other signals on the channel. Depending on the implementation, the channel access module 134 can perform this procedure without random back-off, with random back-off and a contention window of fixed size, with random back-off and a contention window of variable size, etc., to select the duration of a time interval during which the channel access module 134 senses the channel. When the channel access module 134 performs the CCA procedure, the channel access module 134 can compare the level of detected energy to a certain threshold, which the channel access module 134 in some cases can adaptively change. When the CCA procedure does not reveal presence of other signals, the channel access module 134 determines that the channel is clear or idle. Otherwise, when the CCA procedure reveal presence of other signals, the channel access module 134 determines that the channel is occupied.

The wake-up signal controller 136 can determine when the base station 104 should transmit a WUS, on what band(s), and according to which format or configuration. Because a device using the NR-U can gain access to the medium in the middle of a time slot, e.g., at the beginning of a "mini-slot," in at least some of the implementations of the wireless communication network 100, a WUS allows a UE to operate in a more energy-efficient mode. In particular, the UE can monitor WUS transmissions and wake up upon detecting a WUS rather than constantly monitoring a PDCCH at mini-slot granularity.

Figure 3:
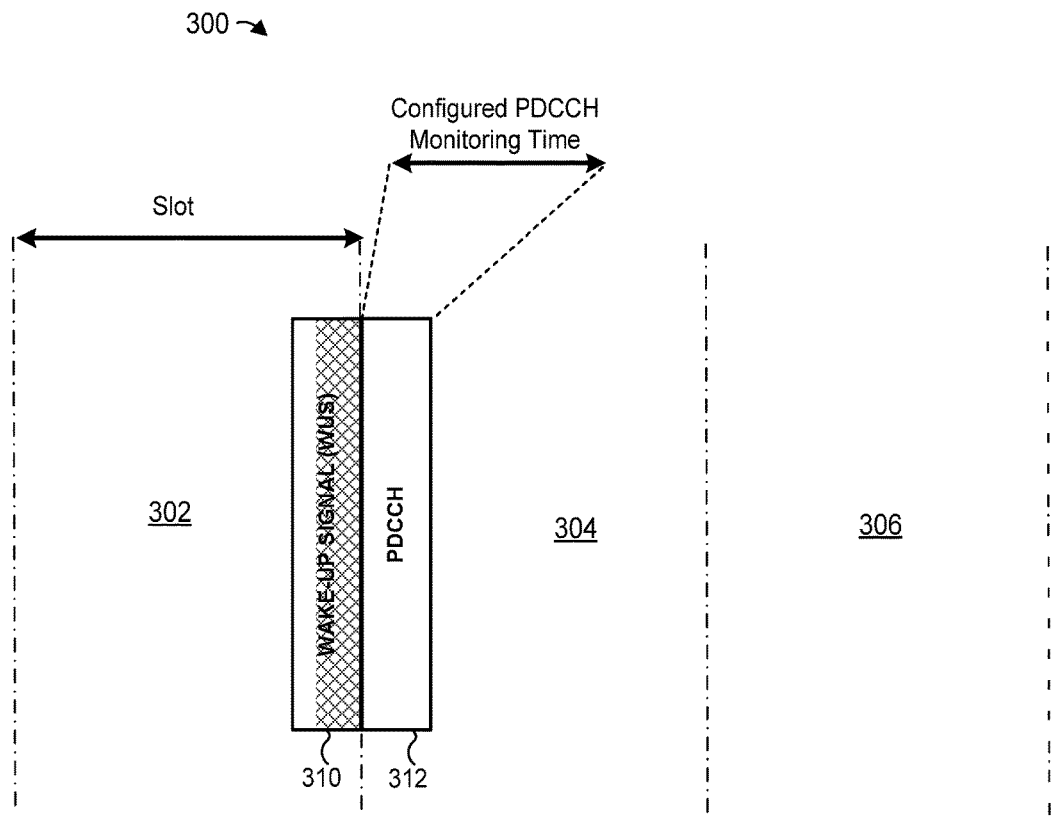
FIG. 3 schematically illustrates the use of a wake-up signal (WUS) to indicate that monitoring of the Physical Downlink Channel (PDCCH) should be performed.

FIG. 3 schematically illustrates an example schedule 300 including time slots 302, 304, 306, etc. A base station schedules a WUS 310 for monitoring a Physical Downlink Channel (PDCCH) transmission 312. As illustrated in FIG. 3, the base station in this example scenario transmits the WUS 310 at the end of the time slot 302, immediately before the PDCCH transmission at the beginning of the subsequent time slot 304. When a UE receives the WUS 310, the UE monitors the channel during the PDCCH monitoring time corresponding to the duration of the PDCCH transmission 312. Otherwise, the UE need not perform the PDCCH monitoring, which can involve FFT computation, channel estimation, de-mapping, Polar code decoding for multiple decoding candidates, and other computationally expensive operations that consume significant amount of power.

Further, devices operating in 5G NR network can use multiple transmission opportunities (TxOPs) in a time slot. A base station in these cases can transmit a respective WUS prior to the starting position of each TxOP, so that the UE processes a TxOP only in response to detecting a corresponding WUS.

Referring again to FIG. 1, the DCI controller 138 uses the channel access module 134 to perform a channel access procedure within the same time slot on multiple channels corresponding to different frequency sub-bands within a BWP, in accordance with a CORESET configuration of a UE. In this manner, when the DCI controller 138 cannot obtain a COT on the first channel, the DCI controller 138 in some cases obtains a COT on the second channel, so that the UE can receive a DCI within the time slot. As discussed in more detail below, the DCI controller 138 performs the channel access procedure on multiple channels in parallel or sequentially, and the DCI controller 138 in various implementations can use no WUS transmissions, a single WUS transmission, or multiple WUS transmissions.

The UE 102 accordingly receives data from the base station 104 according to a two-step process: (i) monitoring and decoding multiple CORESETs to obtain a DCI, and (ii) receiving data on a Physical Downlink Shared Channel (PDSCH), addressed by the DCI.

In particular, the CORESET configuration manager 124 can store indications of when CORESETs are scheduled within a time slot, to what sub-bands within the BWP the CORESETs are allocated, which CORESETs are designed as primary, which CORESETs are designed as secondary, priorities of the CORESETs, etc. The CORESET configuration manager 124 can receive the CORESET configuration from the base station 104. The blind decoder 122 then performs blind decoding procedure on the CORESETs included in the CORESET configuration and attempts to identify a DCI matching the RNTI 128. When the blind decoder 122 successfully obtains a DCI, the downlink transmission processors 126 can receive a PDSCH transmission according to the DCI.

Figure 4:
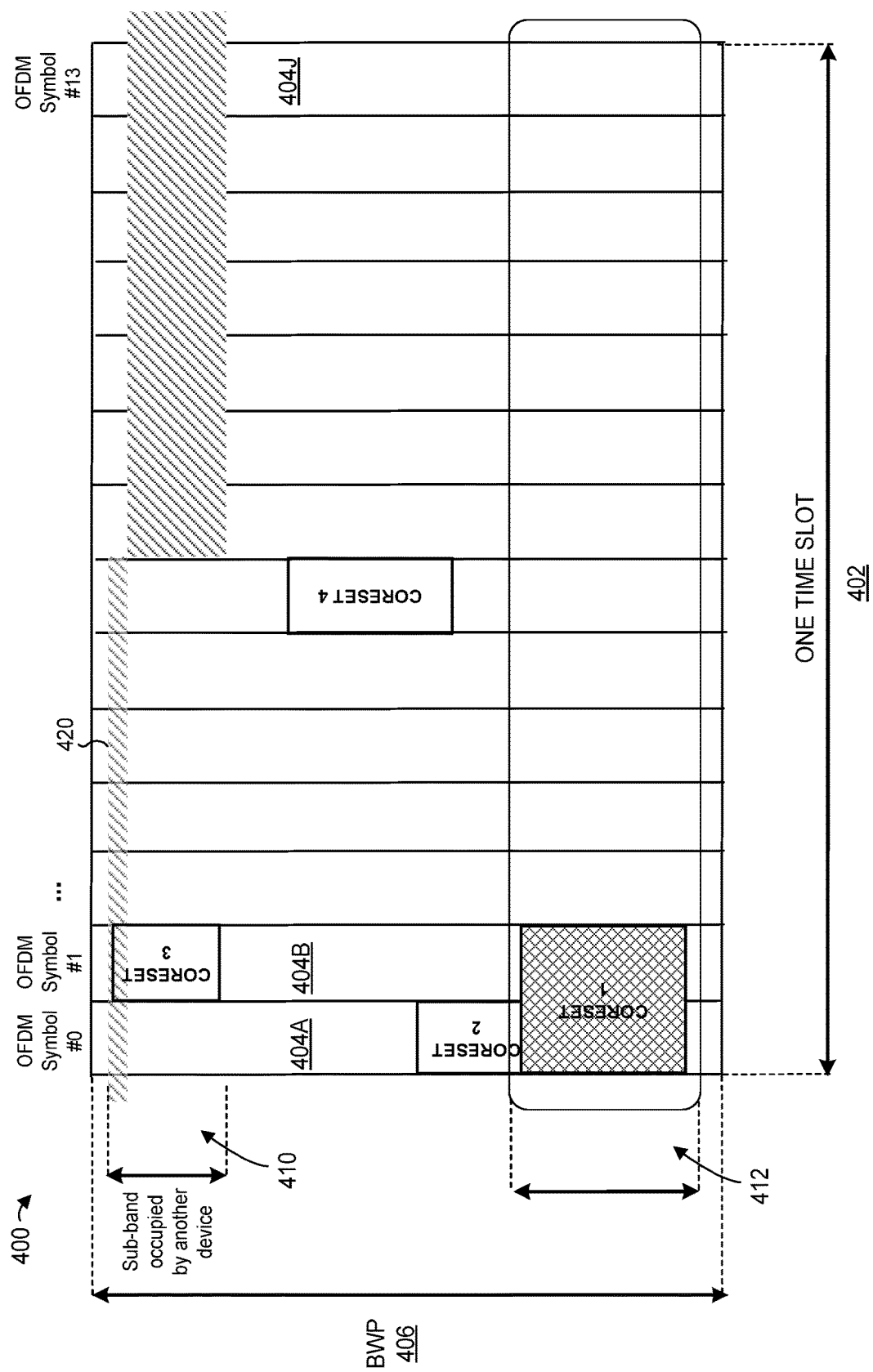
FIG. 4 is an example timing diagram of a time slot of a certain BWP, in which several CORESETs are scheduled.

Referring to FIG. 4, an example timing diagram 400 illustrates a time slot 402 in which the resource allocation unit 132 can schedule several CORESETs for a BWP 406, which can span for instance 80 MHZ. The time slot 402 in this configuration is divided into 14 shorter periods of time corresponding to respective OFDM symbols 404A, 404B, . . . 404J. The resource allocation unit 132 in this example schedules CORESET 1 over OFDM symbols 0 and 1 and over a certain portion of the BWP 406. The resource allocation unit 132 further schedules CORESET 2 over OFDM symbol 0, over another portion of the BWP 406. The CORESETs 1 and 2 in this example partially overlap. Further, the resource allocation unit 132 schedules CORESET 3 over OFDM symbol 1 and over another portion of the BWP 406, such that the CORESET 3 does not overlap with the CORESETs 1 or 2. Still further, the resource allocation unit 132 schedules CORESET 3 over another OFDM symbol and another portion of the BWP 406, such that the CORESET 4 does not overlap with the CORESETs 1-3. The resource allocation unit 132 can provide the CORESETs configuration of FIG. 4 to the UE 102 to schedule uplink and downlink transmissions.

In an example scenario, another device (e.g., the UE 110 or the AP 112 of FIG. 1) transmits over a sub-band 410, which spans approximately 20 MHZ. The device in this scenario outputs a relatively large amount of power. When a pre-existing base station performs an LBT procedure and compares the energy in the BWP 406 to a threshold value for a BWP, the base station determines that the channel of the BWP 406 is busy due to the large amount of power in the sub-band 410, and that the base station should not transmit in the BWP 406 during the time slot 402 at all. Notably, the base station determines that it should not transmit even though approximately 60 MHz out of the 80 MHz of the BWP 406 remain available.

On the other hand, the base station 104 of this disclosure can perform LBT procedures on a channel corresponding to the frequency sub-band 410 as well as on a channel corresponding to another frequency sub-band within the remaining portion of the BWP 406, such as the channel corresponding to a frequency sub-band 412 of CORESET 1. In other words, the base station 104 can perform an LBT procedure on a frequency sub-band that includes a CORESET other than the unavailable CORESET 3. The base station 104 thus can transmit a DCI to the UE 102 over the CORESET 1, 2, or 4, even though another device occupies the sub-band 410 and outputs a relatively large amount of energy on the BWP 406.

These and other techniques which the base station 104 can use to transmit a DCI and the techniques which the UE 102 can implement to obtain the DCI are discussed next with reference to FIGS. 5-18.

Figure 5:
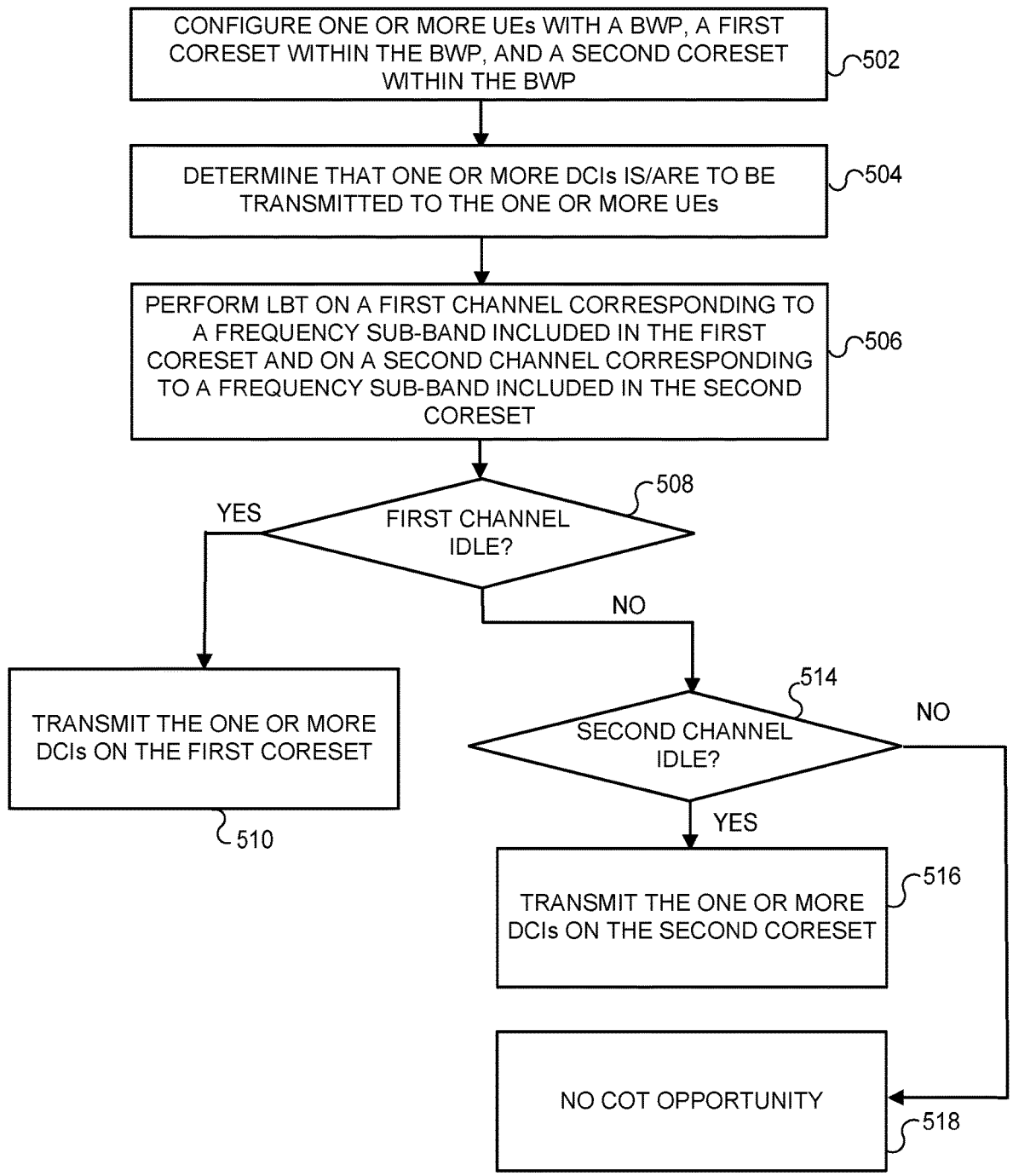
FIG. 5 is a flow diagram of an example method for identifying an available channel occupancy time (COT) to transmit downlink control information (DCI) to a user device, including performing a channel access procedure in parallel, which can be implemented in the base station of FIG. 1.

Referring first to FIG. 5, a method 500 can be implemented in the processing hardware of a base station using hardware, firmware, software, or any suitable combination of hardware, firmware, and software. For convenience, FIG. 5 is discussed below with example reference to the base station 104, in which one or more of the modules 132-138 can implement the method 500.

The method 500 begins at block 502, where the base station 104 configures one or more UEs with a BWP and at least two CORESETs within the BWP. For example, the resource allocation unit 132 can generate a CORESET configuration similar to the one illustrated in FIG. 4 (or the configurations discussed below with reference to FIGS. 12A-16C), and the base station 104 can transmit a Radio Resource Control (RRC) message with the CORESET configuration to the UE 102 and/or other UEs. The RRC message can be for example a broadcast RRC message conveying a system information block (SIB) or a dedicated RRC message such as an RRC Setup message, an RRC Reconfiguration message, an RRC Reestablishment message, or an RRC Resume message. Further, in some implementations, the base station 104 can transmit the CORESET configuration in a Medium Access Control (MAC) control element. Upon receiving the CORESET configuration via a dedicated RRC message, the UE 102 can respond with a corresponding confirmation at the RRC layer, e.g., an RRC Setup Complete message, an RRC Reconfiguration Complete message, an RRC Establishment Complete message, or an RRC Resume Complete message.

In some cases, the base station 104 transmits CORESET configuration to the UE 102 via another base station. In particular, the base station 104 can be configured as a master gNB (MgNB) or a secondary gNB (SgNB). When operating as a SgNB, the base station 104 can transmit an RRC Reconfiguration message to the UE 102 via another gNB, a gNB operating as a a MgNB, a master next generation eNB (Mng-eNB), or a master eNB (MeNB). The base station 104 operating as a SgNB then can receive the RRC Configuration Complete message from the UE 102 via the MgNB, the Mng-eNB, or the MeNB.

As illustrated in FIG. 4, the resource allocation unit 132 can configure a UE with more than two CORESETs, in an overlapping or non-overlapping manner. For example, CORESETS 1 and 3 partially overlap, whereas CORESETS 1 and 3 do not overlap. The overlap in general can occur in frequency, time, or both. In some cases, a CORESET includes a frequency that includes the entire frequency sub-band of another CORESET. In the time domain, the duration of a CORESET similarly can include the entire duration of another CORESET.

Further, the resource allocation unit 132 can assign higher priority to some CORESETs than to other CORESETs. For example, the resource allocation unit 132 can assign a higher priority to CORESET 1 than to CORESET 2. As discussed in more detail below, the UE 102 accordingly can monitor CORESET 1 first and monitor CORESET 2 second. When the CORESET configuration includes more than two CORESETs, the resource allocation unit 132 can assign any number of priorities, e.g., priorities 1, 2, and 3 to CORESETs 1, 2, and 3, respectively; priority 1 to CORESETs 1 and 2 and priority 2 to CORESET 3; etc. As also discussed in more detail below, the resource allocation unit 132 also can designate one of the CORESETs as primary and another CORESET as secondary. When the CORESET configuration includes more than two CORESETs, the resource allocation unit 132 can designate more than one CORESET as primary and/or more than one CORESET as secondary.

Still further, the base station 104 in some implementations configures the first CORESET in a MIB and a second CORESET in a SIB. The base station 104 then broadcasts the MIB and the SIB over the cell 108. For example, the base station 104 can broadcast the MIB on the PBCH and the SIB on the PDSCH. Before broadcasting the SIB, the base station 104 can broadcast a DCI in the first CORESET, if the base station 104 detects that the corresponding channel is idle. The DCI in the first CORESET configures resources of the PDSCH. A UE that receives the DCI in the first CORESET receives the SIB (or the PDSCH) according to the DCI in the first CORESET, and then obtains the configuration of the second CORESET. Moreover, the base station 104 can configure other CORESETs in the SIB in addition to the second CORESET.

In some implementations, the base station 104 transmits a DCI in the first or second CORESET to broadcast the SIB or other SIB(s), if the base station 104 determines that a channel for transmitting the DCI is idle. Depending on the implementation, the base station 104 transmits a WUS before transmitting the DCI or the SIB(s), or transmits the DCI or the SIB(s) without a WUS. Also, the base station 104 in some cases can use multiple CORESETs within the BWP to transmit a DCI for a SIB. In particular, when the base station 104 performs the LBT procedure to determine a channel corresponding to a certain sub-band is not idle, the base station 104 can attempt to use another sub-band to transmit the DCI for the SIB, thus increasing the chances of a successful transmission.

With continued reference to FIG. 5, at block 504, the DCI controller 138 or another component of the base station 104 determines that one or more DCIs are to be transmitted to the one or more UEs via a PDCCH, so that the one or more UEs obtain the information necessary to decode information on the PDSCH. A DCI in general can include such information as the number of resource blocks, resource allocation type, modulation scheme, transport block, redundancy version, coding rate, etc.

Next, at block 506, the channel access module 134 or another suitable component of the base station 104 performs an LBT procedure on a first channel corresponding to the frequency sub-band included in the first CORESET and performs an LBT procedure on a second channel corresponding to the frequency sub-band included in the second CORESET. According to some implementations, the channel access module 134 starts the LBT procedure on the two channels in the same OFDM symbol or the same sub-frame.

When two CORESETs do not overlap, the channel access module 134 can perform the channel access procedure independently on the respective frequency sub-bands that correspond to these two CORESETs. On the other hand, when two CORESETs overlap, the channel access module 134 can perform the channel access procedure on a channel corresponding to a shared frequency sub-band that includes a union of the frequency sub-band of the CORESET and the frequency sub-band of the second CORESET. The base station 104 then makes a common determination regarding transmitting one or more DCIs on the first or the second CORESET: when the channel access module 134 determines that the channel with the shared sub-band is busy, the base station 104 does not transmit a DCI on either the first CORESET or the second CORESET; and when the channel access module 134 determines that the channel with the shared sub-band is idle, the base station 104 chooses at least one of the first CORESET or the second CORESET to transmit one or more DCIs. In some cases, when the sub-band of a first CORESET completely subsumes the sub-band of a second CORESET, the base station 104 can perform the channel access procedure on the channel corresponding to the sub-band of the first CORESET and, when the channel access procedure indicates that channel is idle, infer that the channel of the second CORESET also is idle.

If the base station 104 determines at block 508 that the first channel is idle, the flow proceeds to block 510, where the base station 104 transmits the one or more DCIs on the first CORESET. In particular, the base station 104 transmits the DCI on the channel corresponding to the frequency sub-band included in the CORESET, at a time within the slot occupied by the CORESET. The base station 104 then can complete the method 500. Referring back to the example configuration of FIG. 4, the first channel can correspond to the sub-band 412 included in the CORESET 1, and the second channel can correspond to the sub-band 410 included in the CORESET 3 (thus, in this example, CORESETs 1 and 3 are the first and second CORESETs, respectively).

On the other hand, if the base station 104 determines at block 508 that the first channel is not idle, the flow proceeds to block 514, where the base station 104 determines whether the second channel is idle. If the base station 104 determines that the second channel is idle, the base station 104 transmits the one or more DCIs on the second CORESET, at block 516. Again referring back to the example configuration of FIG. 4, the first channel in this case can correspond to the sub-band 410 included in the CORESET 3, and the second channel can correspond to the sub-band 412 included in the CORESET 1 (thus, in this example, CORESETs 3 and 1 are the first and second CORESETs, respectively).

If the base station 104 determines at block 514 that the second channel is also busy, the flow proceeds to block 518, where the base station 104 determines that the time slot does not include a COT opportunity. More generally, the base station 104 can consider more than two channels and CORESETs (e.g., three, four) before determining that no COT opportunity exists.

According to the method 500, the base station 104 transmits the one or more DCIs either on the first CORESET or the second CORESET, depending on which of the corresponding channels is idle. In another implementation, when the base station 104 determines that both the first channel and the channel are idle, the base station 104 can transmit one or more DCIs on the first CORESET and the remaining one or more DCIs on the second CORESET.

Figure 6:
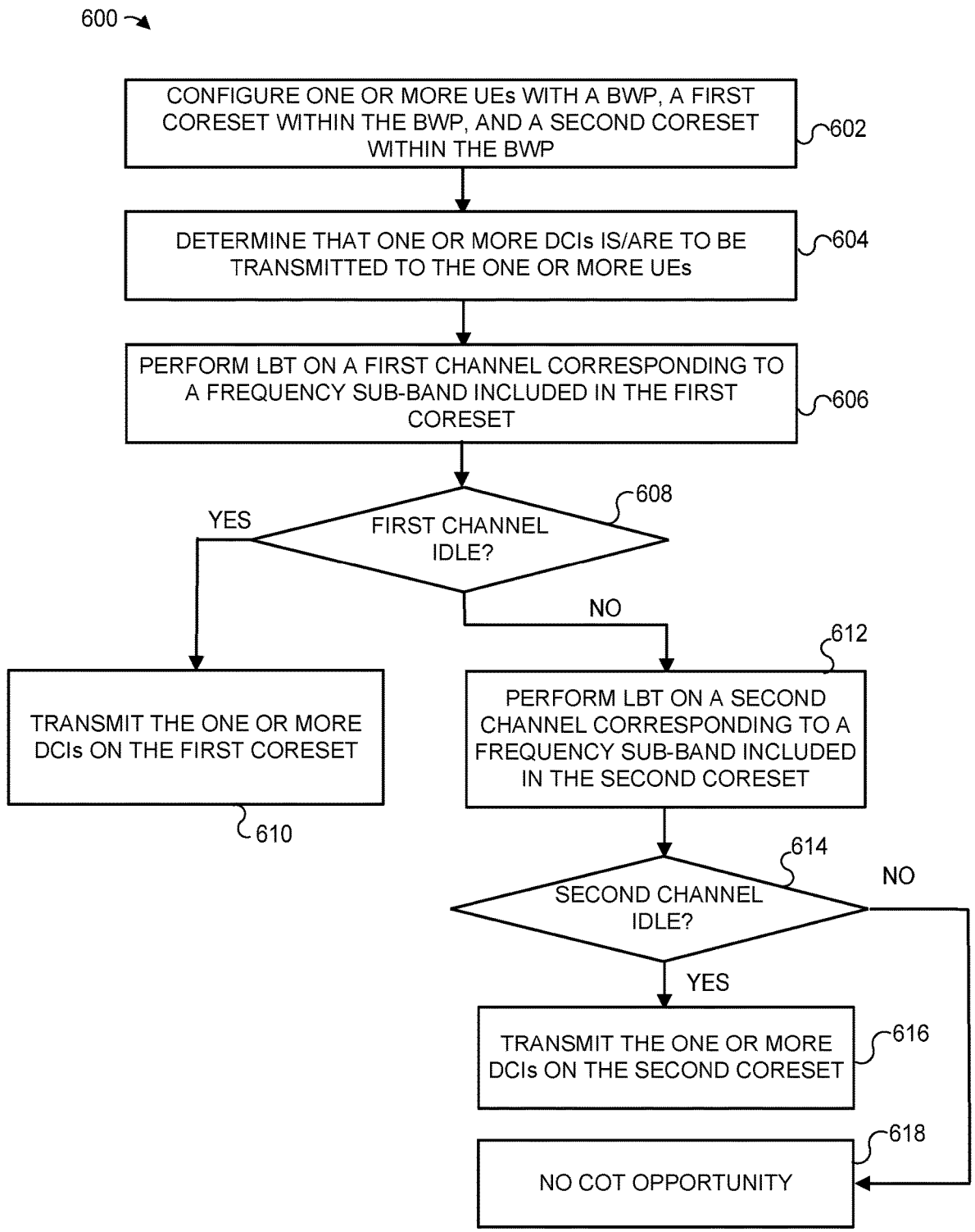
FIG. 6 is a flow diagram of another example method for identifying an available COT to transmit a DCI to a user device, including performing a channel access procedure sequentially, which can be implemented in the base station of FIG. 1.

Next, FIG. 6 illustrates a method 600 that is generally similar to the method of FIG. 5, expect that in this case the base station 104 performs the LBT procedure on the second channel only after determining that the first channel is not idle. In particular, blocks 602 and 604 of the method 600 are similar to blocks 502 and 504, respectively, of the method 500. At block 606, the channel access module 134 or another suitable component of the base station 104 performs an LBT procedure on a first channel corresponding to the frequency sub-band included in the first CORESET.

Similar to the method of FIG. 5, if the base station 104 determines at block 608 that the first channel is idle, the flow proceeds to block 610, where the base station 104 transmits the one or more DCIs on the first CORESET. Otherwise, the channel access module 134 at block 612 performs an LBT procedure on a second channel corresponding to the frequency sub-band included in the second CORESET. The method 600 then proceeds to blocks 614, 616 or 618, which are similar to blocks 514, 516, and 518, respectively, discussed above.

Referring generally to FIGS. 5 and 6, the wake-up signal controller 136 in some cases transmits a WUS on each channel which the channel access module 134 identifies as currently being idle. Moreover, the wake-up signal controller 136 can transmit a respective WUS on a channel corresponding to a frequency sub-band of one of the CORESETs as well as on a channel corresponding to a frequency sub-band not included in any of the CORESETs.

In one example implementation, after the base station 104 determines that the first channel is idle at block 508 or 608, the base station 104 transmits a WUS on the first channel. When base station 104 determines that the second channel is idle at block 514 or 614, the base station 104 also transmits a WUS on the second channel, according to some implementations.

The format or sequence of the WUS transmitted on the second channel in various implementations can be the same as, or different from, the format or sequence of the WUS transmitted on the first channel. The base station 104 in some cases configures the UE 102 with the format or sequence of a WUS or with the multiple formats of the WUS for the corresponding situations. Similar to the CORESET configuration, the base station 104 can provide the one or more WUS formats in a broadcast RRC message, a dedicated RRC message such as an RRC Setup message, an RRC Reconfiguration message, an RRC Reestablishment message, or an RRC Resume message, or a MAC control element.

Various examples of single and multiple WUS transmissions are discussed in more detail with reference to the methods in a UE illustrated in FIGS. 8-11 as well as CORESET configurations of FIGS. 13A-16C.

Figure 7:
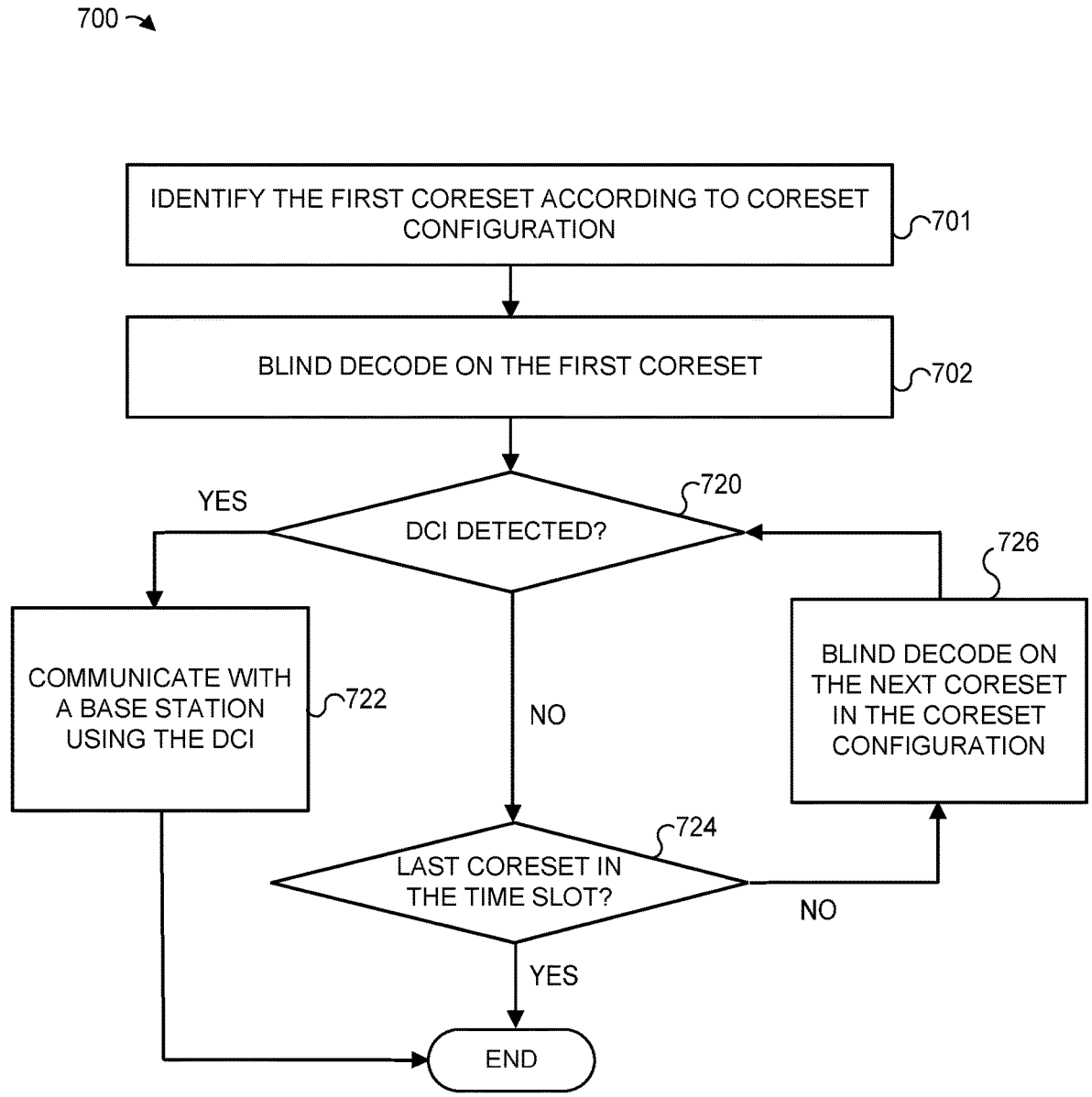
FIG. 7 is a flow diagram of an example method for obtaining a DCI, which can be implemented in the user device FIG. 1.

Referring first to FIG. 7, an example method 700 for obtaining a DCI can be implemented in the processing hardware of a UE using hardware, firmware, software, or any suitable combination of hardware, firmware, and software. For convenience, FIG. 7 is discussed below with example reference to the UE 102, in which one or more of the modules 122-126 can implement the method 700. The method 700 can be considered in connection with the example allocation of CORESETs illustrated in FIGS. 12A-C.

At block 701, the UE 102 identifies the first CORESET for blind decoding. The UE 102 can identify the first CORESET based on the priorities which the base station 104 assigned to the CORESETs and specified as a part of the CORESET configuration in a corresponding RRC message or MAC control element transmitted to the UE 102 (see the discussion of blocks 502 and 602 above). Thus, the UE 102 at block 701 can identify the CORESET with the highest priority.

At block 702, the UE 102 performs blind decoding on the first CORESET. More particularly, the UE 102 can attempt to decode the DCI with the RNTI 128, which as discussed can be a C-RNTI, an RA-RNTI, a SI-RNTI, a P-RNTI, CS-RNTI, etc. If the UE 102 determines at block 720 that a DCI has been successfully detected on the CORESET currently being considered, the flow proceeds to block 722, where the UE 102 can communicate with the base station 104 using the DCI. For example, the UE 102 can receive a PDSCH transmission according to the DCI.

Otherwise, the flow proceeds to block 724, where the UE 102 checks whether the CORESET considered at block 720 was the last one in the CORESET configuration. If there are no more CORESETs to consider, the method 700 completes after block 724, without obtaining a DCI. Otherwise, the flow proceeds to block 726, where the UE 102 performs blind decoding on the next CORESET. The flow then returns to block 720 to determine whether this next (e.g., second, third, fourth) CORESET includes a DCI for the UE 102.

Figure 8:
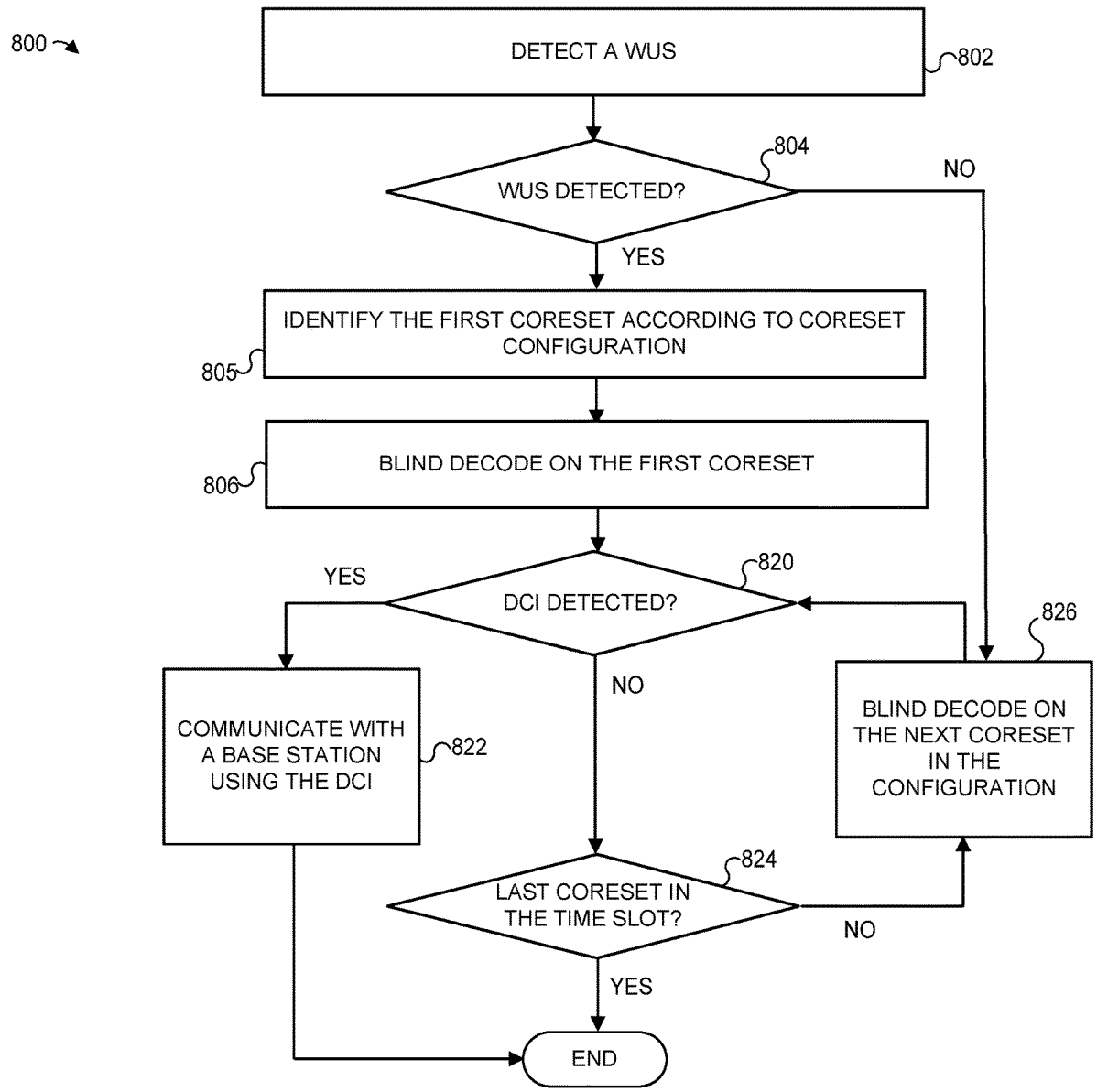
FIG. 8 is a flow diagram of another example method for obtaining a DCI, which includes using a wake-up signal (WUS), and which also can be implemented in the user device FIG. 1.

Next, FIG. 8 illustrates a method 800 according to which the UE 102 detects a WUS prior to performing blind decoding on a CORESET. The method 800 can be considered in connection with the example allocation of CORESETs illustrated in FIGS. 13A-C. In particular, the method 800 begins with the UE 102 attempting to detect a WUS at block 802. As illustrated in FIG. 3 and as discussed above, a WUS transmission occurs at a particular time, such as just prior to the start of a time slot or at shorter intervals within a time slot. Depending on the implementation, the WUS can be specific to the sub-band included in the CORESET, or the WUS can span the entire BWP in which the UE 102 is configured to operate.

If the UE 102 determines that a WUS has been detected (block 804), the flow proceeds to block 805, where the UE 102 can identify the first CORESET for blinding decoding (similar to block 701 discussed above), and then to block 806, where the UE 102 performs blind decoding on the first CORESET. Similar to blocks 720, 722, 724, and 726 discussed above, the UE 102 determines whether a DCI has been detected at block 820, communicates with the base station 104 using the DCI at block 822 if a DCI has in fact been detected, determines whether there are more CORESETs to consider at block 824, and performs blind decoding on the next CORESET at block 826. The UE 102 can select the next CORESET in accordance with the priorities in the CORESET configuration.

If the UE 102 determines at block 804 that no WUS has been detected, the flow proceeds directly to block 826. In other words, the UE 102 in this case does not perform blind decoding on the first CORESET but performs blind decoding on the second CORESET.

Figure 9:
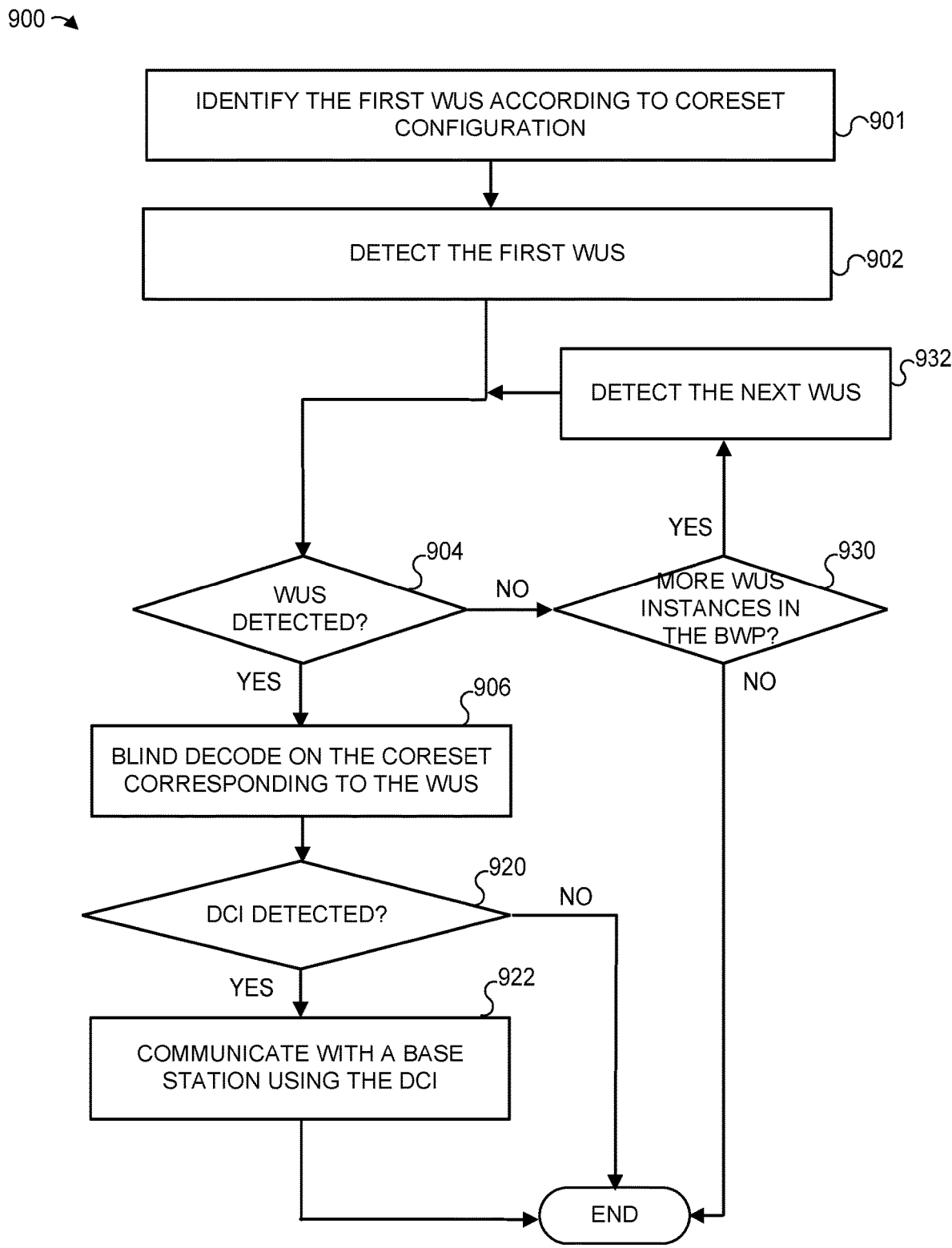
FIG. 9 is a flow diagram of another example method for obtaining a DCI, which includes detecting several instances of a WUS, and which also can be implemented in the user device FIG. 1.

Next, FIG. 9 illustrates a method 900 according to which the UE 102 potentially attempts to detect a WUS in multiple instances prior to performing blind decoding on a CORESET. The method 900 begins at block 901, where the UE 102 identifies the first WUS based on the priorities which the base station 104 assigned to the corresponding CORESETs and specified as a part of the CORESET configuration.

At block 902, the UE 102 attempts to detect a first WUS. If the UE 102 determines that a WUS has been detected (block 904), the flow proceeds to block 906, where the UE 102 performs blind decoding on the first CORESET. Similar to blocks 720 and 722 discussed above, the UE 102 determines whether a DCI has been detected at block 920 and communicates with the base station 104 using the DCI at block 922 if a DCI has in fact been detected.

If, at block 904, the UE 102 determines that no WUS has been detected, the flow proceeds to 930. The UE 102 at block 930 determines whether the CORESET configuration for the BWP includes other instances of a WUS and, if so, detects the next WUS at block 932. The base station 104 can transmit each WUS on the sub-band including in the corresponding CORESET. Referring back to FIG. 4, for example, the base station 104 can transmit a WUS for the CORESET 1 in the sub-band 412 and a WUS for the CORESET 3 in the sub-band 410.

If the UE 102 determines at block 930 that there are no more instances of a WUS left in the configuration, the method 900 completes. Thus, according to the method 900, the UE 102 performs blind decoding on a channel only if the UE 102 receives a corresponding WUS. In some implementations, the UE 102 attempts to detect the first WUS, the second WUS, etc. in parallel rather than sequentially.

Figure 10:
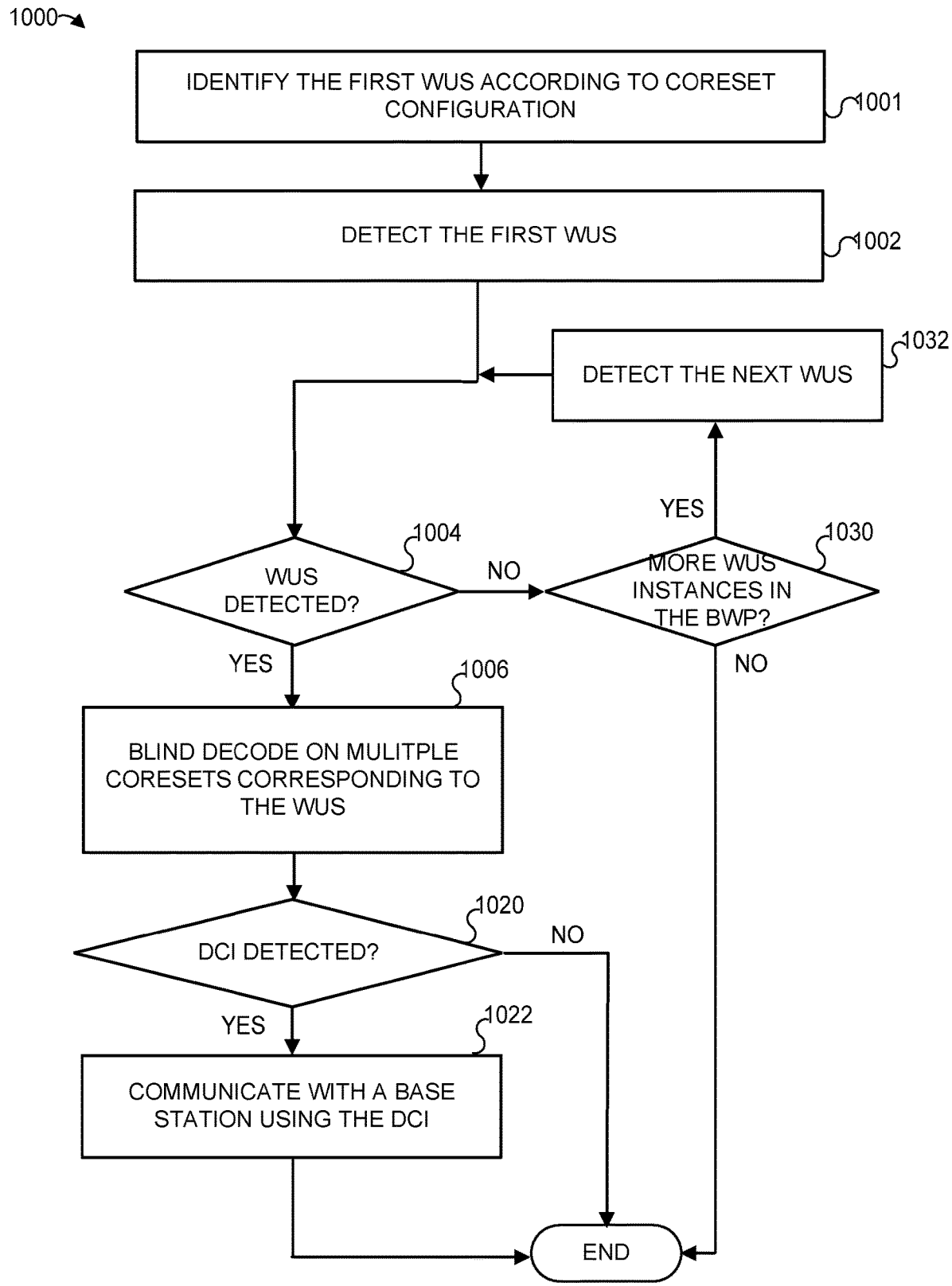
FIG. 10 is a flow diagram of another example method for obtaining a DCI, which includes detecting a WUS corresponding to multiple CORESETs, and which also can be implemented in the user device FIG. 1.

FIG. 10 illustrates another example method 1000 in the UE 102 (or another suitable UE) for obtaining a DCI. According to the method 1000, the UE 102 detects a WUS corresponding to multiple CORESETs, which can be a subset of the CORESET configuration for the UE 102 or the entire set of CORESETs.

More specifically, the UE 102 at block 1001 identifies the first WUS (similar to block 901 discussed above) and, at block 1002, attempts to detect the first WUS. If the UE 102 determines that a WUS has been detected (block 1004), the flow proceeds to block 1006, where the UE 102 performs blind decoding on the CORESETs corresponding to the WUS. For example, the UE 102 can be configured as illustrated in FIG. 4, and the WUS detected at block 1002 can correspond to CORESETs 1 and 3. Similar to blocks 720 and 722 discussed above, the UE 102 determines whether a DCI has been detected at block 1020 and communicates with the base station 104 using the DCI at block 1022 if a DCI has in fact been detected.

Otherwise, if the UE 102 determines at block 1004 that no WUS has been detected, the flow proceeds from block 1004 to block 1030, where, similar to block 930 discussed above, the UE 102 determines whether the CORESET configuration for the BWP includes other instances of a WUS. When the UE 102 determines that the set of WUS transmissions has been exhausted, the method completes. Otherwise, the flow proceeds to block 1032, where the UE 102 attempts to detect the next WUS. The next WUS in turn can correspond to a single CORESET or multiple CORESETs.

Figure 11A:
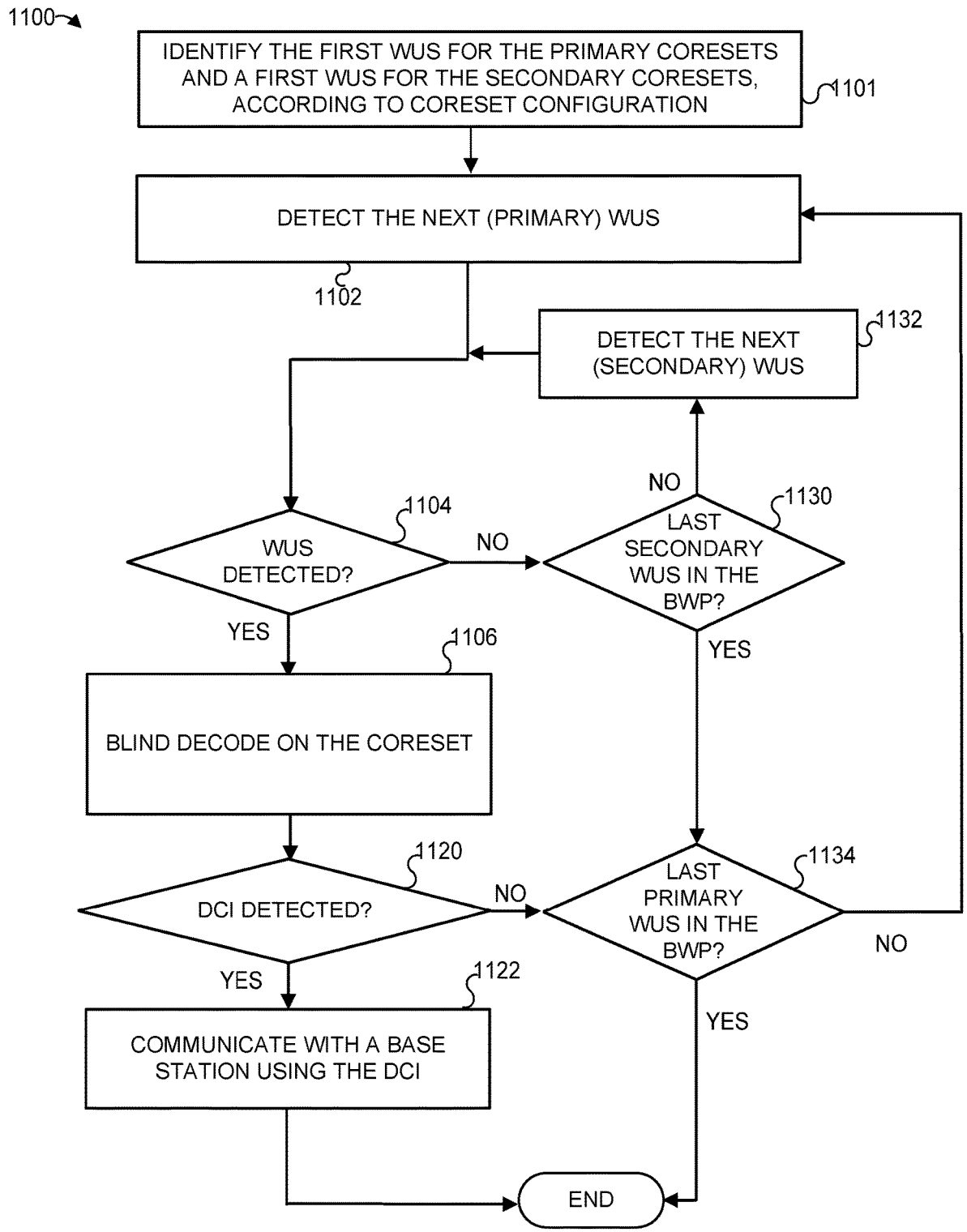
FIG. 11A is a flow diagram of another example method for obtaining a DCI, which includes detecting a respective WUS for a primary and a secondary CORESET, and which also can be implemented in the user device FIG. 1.

FIG. 11A illustrates another example method 1100 in the UE 102 (or another suitable UE) for obtaining a DCI. According to the method 1100, the CORESET configuration for the UE 102 includes primary and secondary CORESET and WUS designation, and the UE 102 detects a secondary WUS only after the attempt to detecting the corresponding primary WUS fails.

At block 1101, the UE 102 determines the order of processing WUS transmissions. In this implementation, the same CORESET configuration can specify priorities for the primary and secondary CORESETs. For example, a certain CORESET configuration can include a primary CORESET with a first (high) priority, a second primary CORESET with a second (lower) priority, a first secondary CORESET with a first (high) priority, and second secondary CORESET with a second (lower) priority. The CORESET configuration also can specify a respective WUS for each of these CORESETs. As discussed above, the base station 104 can provide the CORESET configuration in a certain RRC message or a MAC control element, for example.

Next, at block 1102, the UE 102 attempts to detect a primary WUS. More specifically, the UE 102 attempts to detect a WUS on a channel corresponding to a frequency sub-band included in the primary CORESET. When the CORESET configuration of the UE 102 includes multiple primary CORESETs, the UE 102 at block 1102 can attempt to detect a WUS on one of the channels with which primary CORESETs are associated, in accordance with the priority of the corresponding CORESET specified in the CORESET configuration. For example, if CORESET 1 is primary with priority 1, and CORESET 2 is primary with priority 2, the UE 102 first attempts to detect a WUS for CORESET 1.

At block 1104, the UE 102 determines whether a primary WUS has been detected and, if so, the flow proceeds to block 1106. The UE 102 at block 1106 performs blind decoding on the primary CORESET corresponding to the primary WUS. The UE 102 then determines whether a DCI has been detected at block 1120 and communicates with the base station 104 using the DCI at block 1122 if a DCI has been successfully detected. If, at block 1120, the UE determines that no DCI has been successfully detected, the UE 102 proceeds to block 1134.

If, at block 1104, the UE 102 determines that no primary WUS has been detected, the UE 102 determines whether there remains a secondary WUS in the BWP. Thus, according to the method 1100, when the UE 102 cannot detect a primary WUS, the UE 102 attempts to detect a secondary WUS as a substitution, before attempting to detect another primary WUS.

At block 1134, the UE 102 determines whether the attempt was for the last primary WUS in the BWP. If there remain primary WUS instances to detect, the flow returns to block 1102, where the UE 102 attempts to detect the next primary WUS (in accordance with the priority specified in the CORESET configuration), and then again to block 1104. The UE 102 attempts to detect a WUS at block 1132 in a manner similar to the WUS detection at block 1102, except that at block 1132 the UE 102 attempts to detect a secondary WUS.

Alternatively, one WUS can correspond to two or more CORESETs designated as primary, and another WUS can correspond to two or more CORESETs designated as secondary. The UE 102 accordingly can attempt to perform blind decoding on all the primary CORESETs in response to detecting the single primary WUS and, when necessary, attempt to perform blind decoding on all the secondary CORESETs in response to detecting the single secondary WUS.

Figure 11B:
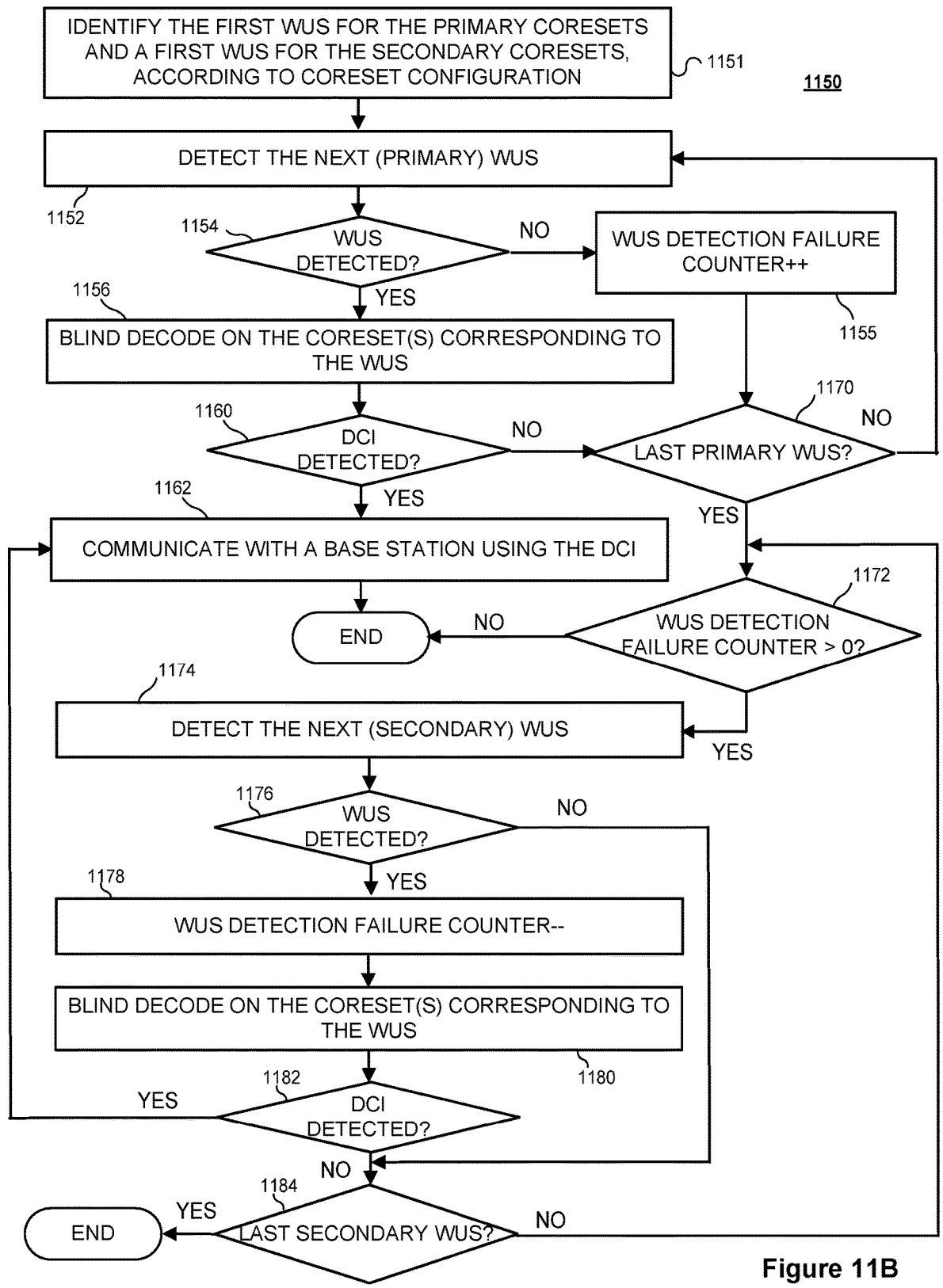
FIG. 11B is a flow diagram of another example method for obtaining a DCI, which includes attempting to detect an equal number of WUS transmissions for primary and secondary CORESETs, and which also can be implemented in the user device FIG. 1.

FIG. 11B illustrates another example method 1150 in the UE 102 (or another suitable UE) for obtaining a DCI. Similar to the method 1100 discussed above, the method 1150 includes identifying primary and secondary WUS transmissions. However, according to the method 1150, the UE 102 first considers every primary WUS and, if the UE 102 cannot successfully decode a DCI for any of the primary WUS transmissions, the UE 102 attempts to detect the same number of secondary WUS transmissions. For example, for a configuration that includes three primary CORESETs with the corresponding WUS instances, the UE 102 may detect two WUS instances, and then fail to decode the DCI on either of the primary CORESETs corresponding to these WUS instances. The UE 102 accordingly can attempt to decode two secondary WUS instances and decode two corresponding secondary CORESETs, as substitutes for the primary CORESETs.

In particular, the method 1150 begins at block 1151, which can be similar to block 1101 discussed above. At block 1152, the UE 102 attempts to detect a primary WUS, similar to block 1102. The UE 102 then determines, at block 1154, whether a primary WUS has been detected, similar to block 1104. The UE 102 at block 1156 performs blind decoding on the primary CORESET corresponding to the primary WUS, similar to block 1106. Further, similar to blocks 1120 and 1122, the UE 102 at block 1160 determines whether a DCI has been detected and communicates with the base station 104 using the DCI at block 1162, if a DCI has been successfully detected. The method 1150 completes after executing block 1162. If, however, the UE 102 determines at block 1160 that no DCI has been successfully detected, the flow proceeds to block 1170.

If the UE 102 at block 1154 determines that a primary WUS has not been detected, the flow proceeds to block 1155, where the UE 102 increments the WUS detection failure counter (the initial value of the WUS detection failure counter is zero at the beginning of the method 1150). If the UE 102 then determines that there are more primary WUS transmissions to consider, the flow returns to block 1152, where the UE 102 attempts to detect another primary WUS. The UE 102 can consider the primary WUS instances in accordance with the corresponding priorities included in the CORESET configuration.

When the UE 102 at block 1170 determines that the CORESET processed at blocks 1156 and 1160 corresponded to the last primary WUS, the flow advances to block 1172. The method 1150 completes if the UE 102 determines, at block 1172, that the WUS detection failure counter from block 1155 is at zero after processing the one or more instances of the primary WUS and the corresponding CORESETs. Otherwise, if the WUS detection failure counter is greater than zero, the flow proceeds to block 1174, where the UE 102 attempts to detect a secondary WUS. If the UE 102 detects a secondary WUS (block 1176, the YES branch), the UE 102 decrements the WUS detection failure counter at block 1178 and performs blind decoding on the secondary CORESET corresponding to the secondary WUS, at block 1180.

If the UE 102 determines at block 1182 that no DCI has been successfully detected, the UE 102 checks at block 1184 whether there are more instances of the secondary WUS to consider. The UE 102 can consider the secondary WUS instances in accordance with the corresponding priorities included in the CORESET configuration, similar to the primary WUS instances. The method 1150 completes after executing block 1184 if there no more instances of the WUS to consider; otherwise, the flow returns to block 1172, where the UE 102 checks whether the WUS detection failure counter has reached zero. When the flow completes as a result of cycling through all the secondary WUS instances per block 1184 or as a result of the WUS detection failure counter decrementing to zero per block 1172, the method 1150 can restart at the next time slot.

As indicated above, the base station 104 in some cases also assigns priorities to CORESETs. Several examples of allocating CORESETS in a BWP and, depending on the implementation, designating the CORESETs as primary or secondary, assigning priorities to these CORESETs, and using WUS instances are considered next with reference to FIGS. 12A-16C.

Figure 12C:
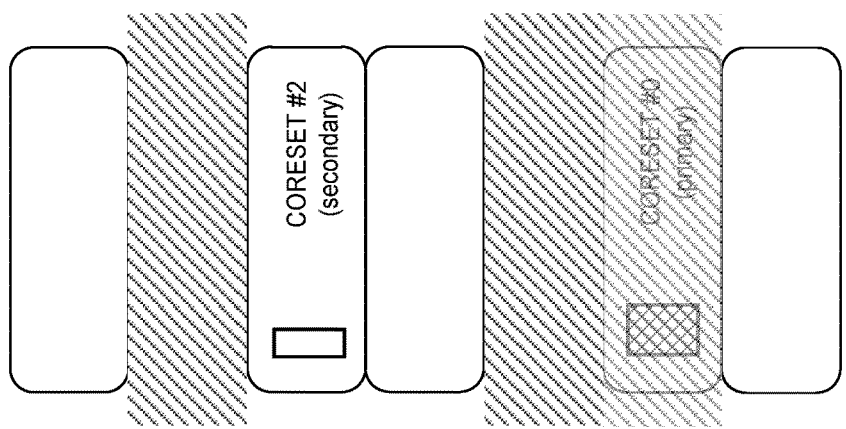
FIG. 12C illustrates a scenario in which all the sub-bands in which CORESETs are allocated as illustrated in FIG. 12A are occupied by other devices.
Figure 12B:
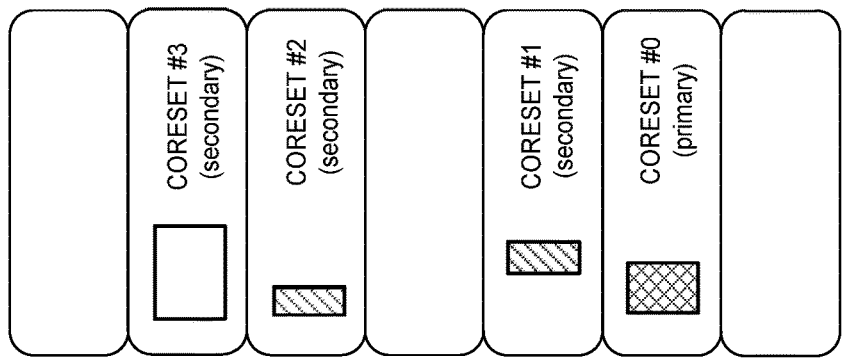
FIG. 12B illustrates a scenario in which the sub-band of the primary CORESET, allocated as illustrated in FIG. 12A, is occupied by another device.
Figure 12A:
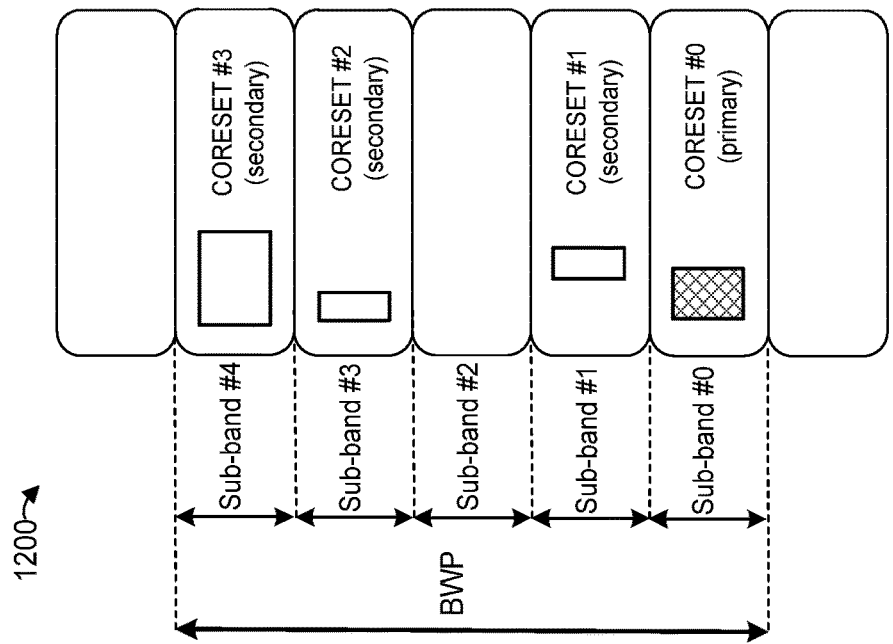
FIG. 12A schematically illustrates an example allocation of CORESETs within a BWP with no WUS configuration, according to which the devices of FIG. 1 can operate.
Figure 14C:
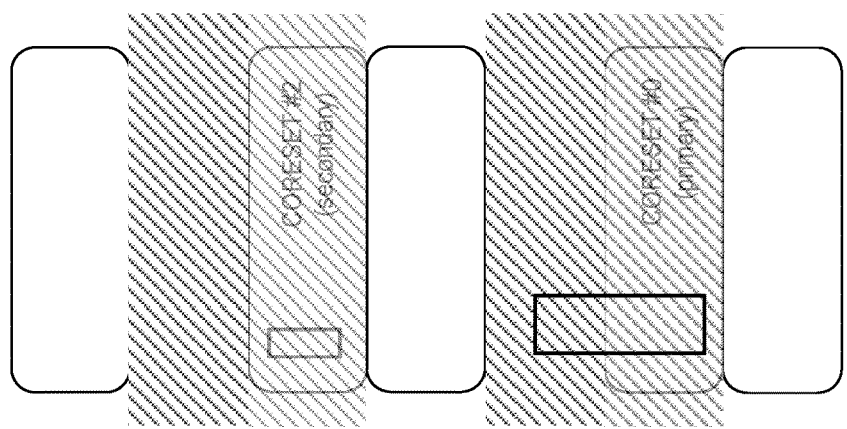
FIG. 14C illustrates a scenario in which all the sub-bands in which CORESETs are allocated as illustrated in FIG. 14A are occupied by other devices.
Figure 14B:
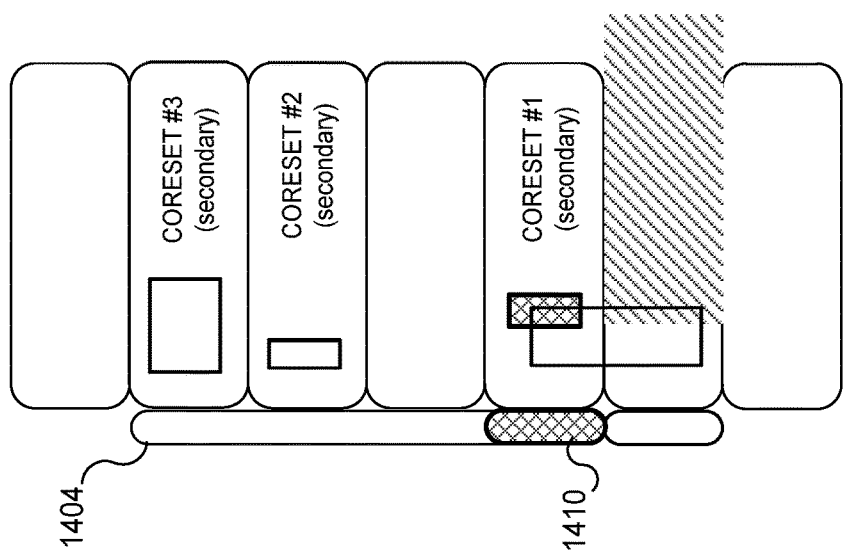
FIG. 14B illustrates a scenario in which the sub-band of the primary CORESET, allocated as illustrated in FIG. 14A, is occupied by another device.
Figure 14A:
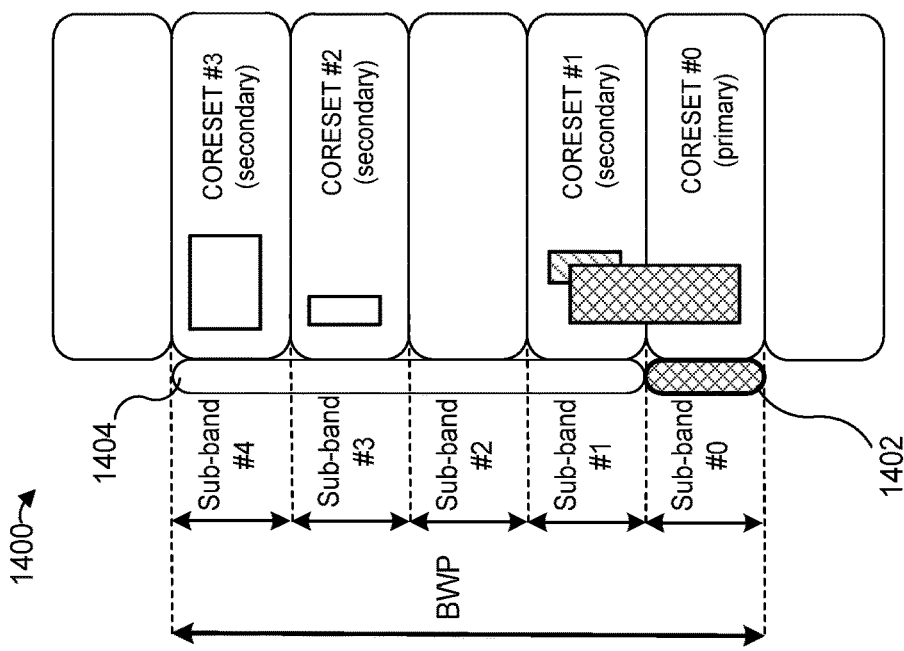
FIG. 14A schematically illustrates another example allocation of CORESETs within a BWP, with a WUS associated with the primary CORESET, according to which the devices of FIG. 1 can operate.
Figure 15C:
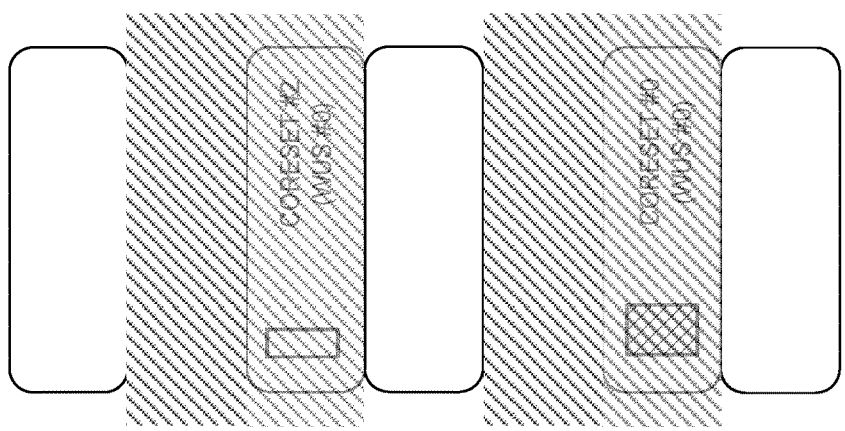
FIG. 15C illustrates a scenario in which all the sub-bands in which CORESETs are allocated as illustrated in FIG. 15A are occupied by other devices.
Figure 15B:
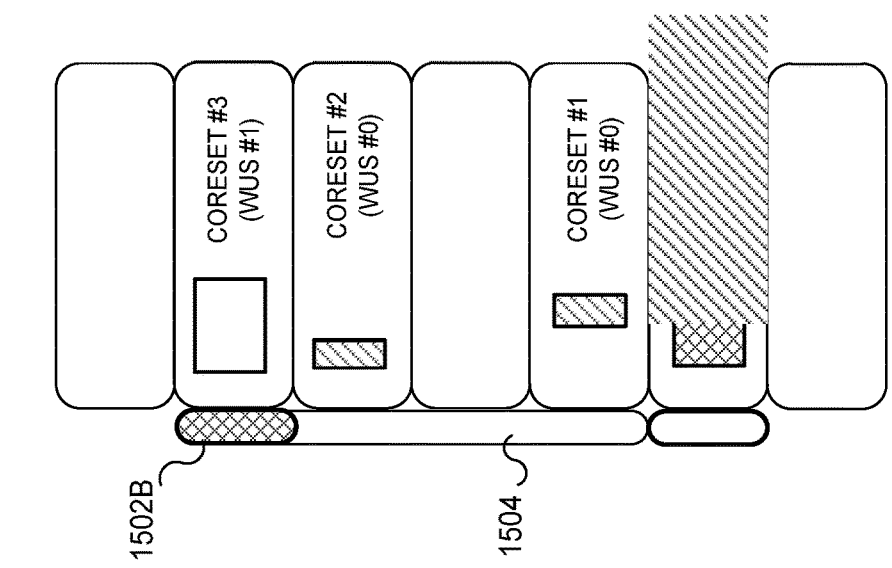
FIG. 15B illustrates a scenario in which the sub-band of the primary CORESET, allocated as illustrated in FIG. 15A, is occupied by another device.
Figure 15A:
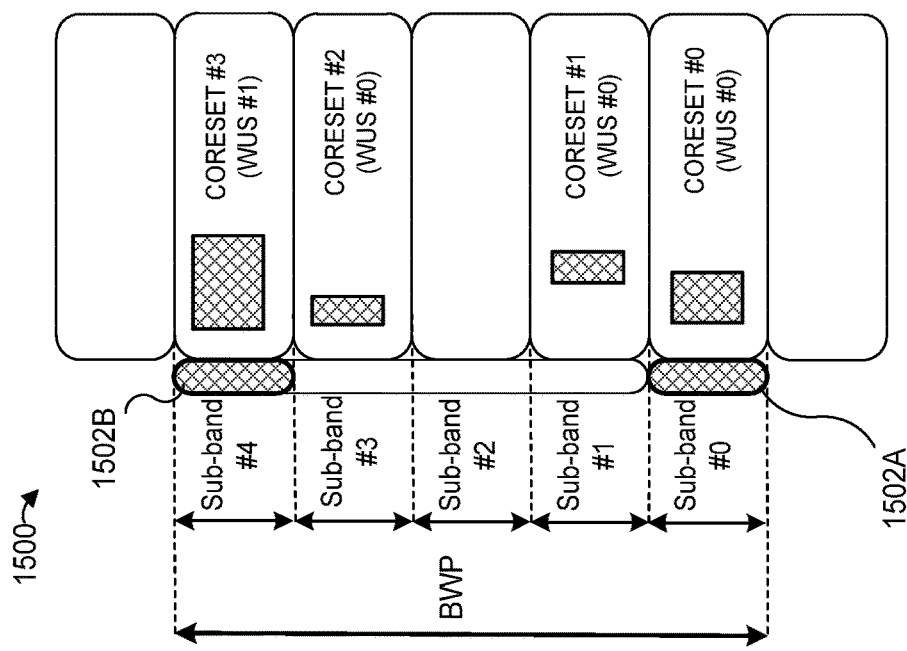
FIG. 15A schematically illustrates an example allocation of CORESETs within a BWP, with a WUS associated with multiple CORESETs, according to which the devices of FIG. 1 can operate.
Figure 16C:
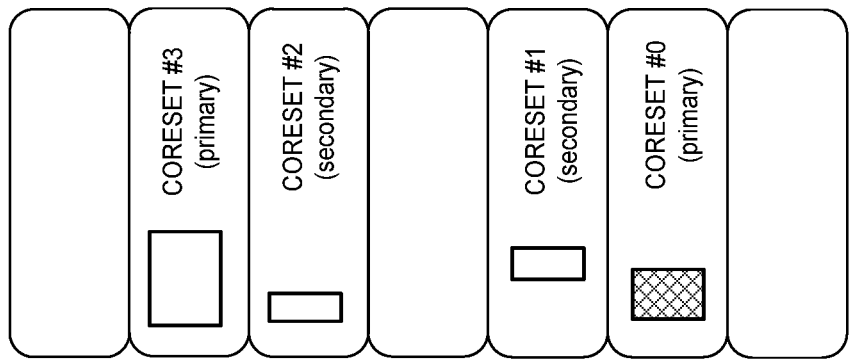
FIG. 16C illustrates a scenario in which all the sub-bands in which CORESETs are allocated as illustrated in FIG. 16A are occupied by other devices.

Although these examples of FIGS. 12A-16C are discussed with reference to the operations at the base station 104, the UE 102 also can implement certain methods to properly process the transmission that conform to these schemes, in particular: the UE 102 can detect the DCI according to the method 700 of FIG. 7 when the base station 104 uses the scheme of FIGS. 12A-C, the method 800 of FIG. 8 when the base station 104 uses the scheme of FIGS. 13A-C, the method 900 of FIG. 9 when the base station 104 uses the scheme of FIGS. 14A-C, the method 1000 of FIG. 10 when the base station 104 uses the scheme of FIGS. 15A-C, and the methods 1100 and 1150 of FIGS. 11A and 11B when the base station 104 uses the scheme of FIGS. 16A-C.

First, FIGS. 12A-C schematically illustrates an example allocation 1200 of CORESETs #0- #3 within a BWP, with no WUS configuration. When the base station 104 has a signal to transmit (e.g., PDCCH, PDSCH), the base station 104 determines the availability of a CORESET according of the results of an LBT procedure (or another suitable channel access procedure) as well as the priority assigned to the CORESETs.

In the example of FIGS. 12A-C. CORESET #0 has the highest priority, CORESET #1 has the second-highest priority, CORESET #2 has the third-highest priority, the CORESET #3 has the lowest priority. Further, the base station 104 designates CORESET #0 as primary and the remaining CORESETs as secondary. The CORESETs are allocated within the BWP as follows: CORESET #0 is in sub-band #0, CORESET #1 is in sub-band #1, CORESET #2 is in sub-band #3, and CORESET #3 is in sub-band #4. CORESETs ##0, 2, and 3 in this example configuration are scheduled to begin simultaneously in the time slot, and CORESET #1 is scheduled to begin at a later time. The UE 102 can perform blind decoding on these CORESETs in accordance with the assigned priorities.

FIG. 12A illustrates the initial configuration and the situation when then every sub-band is idle. The base station 104 can perform the LBT procedure on the channel corresponding to sub-band #0 or, in another implementation, on all channels corresponding to sub-bands #0, #1, . . . #4, respectively. The base station 104 then transmits a DCI on the primary CORESET #0. Referring back to FIGS. 5 and 6, the base station 104 can transmit the DCI in accordance with the scheme of FIG. 12A when the base station 104 determines, at block 508 or 610, that the first channel is idle, and proceeds to block 510 or 610, respectively. The UE 102 in turn can detect and apply the DCI in accordance with the scheme of FIG. 12A at blocks 702, 720, and 722, for example.

In the scenario of FIG. 12B, however, the sub-band of the primary CORESET #0 is occupied. After the base station 104 determines that the channel of sub-band #0 is occupied by performing the LBT procedure, the base station 104 determines that the channel of sub-band #1 is idle (see, for example, the transitions from block 508 to block 514 and then to block 516, or the transitions from block 608 to block 614 and then to block 616, in FIGS. 5 and 6, respectively). The base station 104 then transmits the DCI on the secondary CORESET #1, in accordance with the priority of this CORESET (which is higher than the priorities of the other secondary CORESETs).

FIG. 12C illustrates a scenario in which all the sub-bands with CORESETs are occupied. The base station 104 determines that these sub-bands are occupied and skips the COT opportunity. Again referring back to FIGS. 5 and 6, the base station 104 can transition to block 518 or block 618 after determining, at block 514 or block 614, that the second channel (or a third, fourth, etc. channel, depending on the implementation) is not available.

Figure 13C:
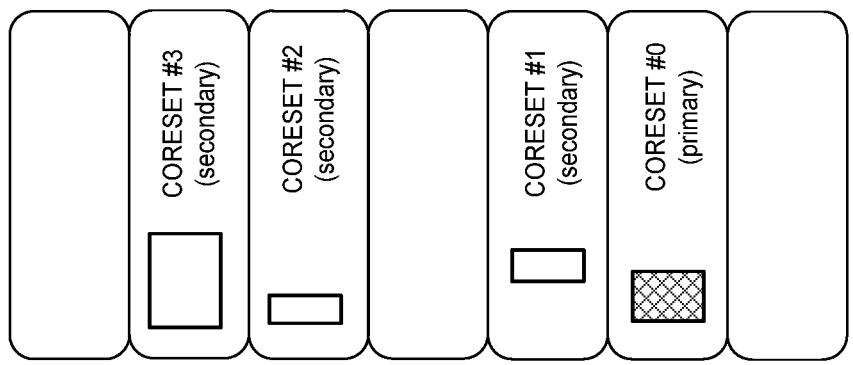
FIG. 13C illustrates a scenario in which all the sub-bands in which CORESETs are allocated as illustrated in FIG. 13A are occupied by other devices.
Figure 13B:
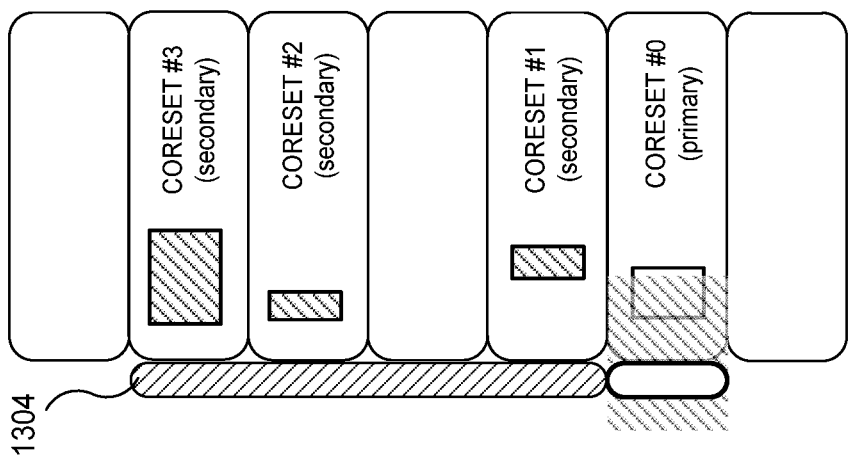
FIG. 13B illustrates a scenario in which the sub-band of the primary CORESET, allocated as illustrated in FIG. 13A, is occupied by another device.
Figure 13A:
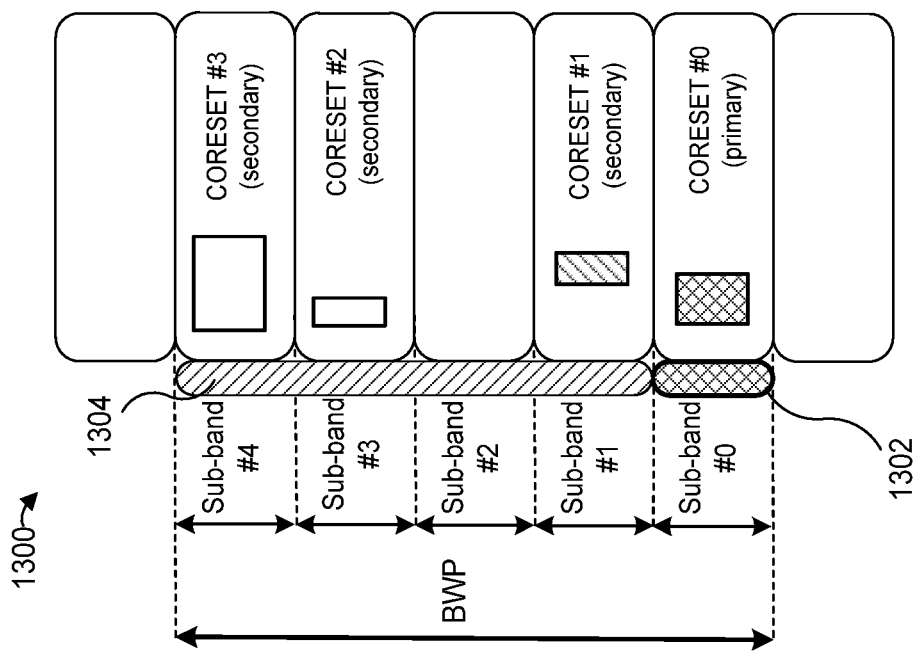
FIG. 13A schematically illustrates an example allocation of CORESETs within a BWP with a WUS associated with the primary CORESET, according to which the devices of FIG. 1 can operate.

Next, FIGS. 13A-C schematically illustrates an example allocation 1300 of CORESETs #0- #3 within a BWP, with a WUS assigned to the channel corresponding to sub-band #0 of CORESET #0. The base station 104 configures the time, frequency sub-bands, primary/secondary designation, and priority of the CORESETs as discussed above with reference to FIGS. 12A-C.

When the base station 104 has a signal to transmit (e.g., PDCCH, PDSCH), the base station 104 determines the availability of a CORESET according of the results of an LBT procedure (or another suitable channel access procedure) as well as the priority assigned to the CORESETs; and when the channel for the primary CORESET #0 is idle, the base station transmits a WUS before transmitting the CORESET. Otherwise, the when the channel for the primary CORESET #0 is occupied, the base station does not transmit a WUS. The base station 104 transmits a DCI on the available CORESET.

In particular, FIG. 13A illustrates the situation when then every sub-band is idle. The base station 104 transmits a WUS 1302 on the channel corresponding to sub-band #0 and transmits a DCI on CORESET #0. The base station 104 also can transmit reservation signals 1304, which can be transmissions at certain energy levels but with no specific information, on the unoccupied channels corresponding to sub-bands ##1-4. The UE 102 can detect and apply the DCI in accordance with the scheme of FIG. 13A at blocks 804 (the YES branch), 805, 806, 820, and 822 of FIG. 8; blocks 902, 904 (the YES branch), 906, 920 (the YES branch) and 922; and blocks 1002, 1004 (the YES branch), 1006, 1020 (the YES branch), and 1022.

In the situation illustrated in FIG. 13B, the base station 104 determines that the sub-band of the primary CORESET #0 is occupied, and that the channels of sub-bands ##1-3 are idle. The base station 104 accordingly transmits the DCI on CORESET #1, #2, or #3, without transmitting a WUS. In one implementation, the base station 104 chooses CORESET #1 over CORESETs ##2 and 3 because of the higher priority of CORESET #1. To detect a DCI in this scenario, UE 102 can operate as illustrated in FIG. 8, for example (the NO branch of block 820 and blocks 824, 826, 820 again, and eventually 822). Similar to FIG. 12C, FIG. 13C illustrates a scenario in which all the sub-bands with CORESETs are occupied, and the base station 104 skips the COT opportunity (see the YES branch of block 824, for example).

FIGS. 14A-C schematically illustrates an example allocation 1400 of CORESETs #0- #3 within a BWP, with a respective WUS assigned to the channel corresponding to the sub-band of a certain CORESET. The base station 104 configures the time, frequency sub-bands, primary/secondary designation, and priority of the CORESETs generally similar to the examples of FIGS. 12A-C and 13A-C, but in this example CORESETs #0 and #1 partially overlap.

FIG. 14A illustrates the situation when every sub-band is idle. The base station 104 transmits a WUS 1402 on the channel corresponding to band #0 and transmits a DCI on CORESET #0. The base station 104 also transmits reservation signals 1404 on the unoccupied channels corresponding to sub-bands ##1-4. Referring back to FIGS. 5 and 6, the base station 104 can transmit the DCI in accordance with the scheme of FIG. 14A when the base station 104 determines, at block 508 or 610, that the first channel is idle, and proceeds to block 510 or 610, respectively. The UE 102 in turn can detect and apply the DCI in accordance with the scheme of FIG. 14A at blocks 902, 904 (the YES branch), 906, 920 (the YES branch), and 922 of FIG. 9, for example.

In the situation illustrated in FIG. 14B, the base station 104 determines that the sub-band of the primary CORESET #0 is occupied, and that the channels of sub-bands ##1-3 are idle. The base station 104 accordingly transmits the DCI on CORESET #1 and transmits a WUS 1410 on the channel corresponding to sub-band #1. Similar to FIG. 13C, FIG. 14C illustrates a scenario in which all the sub-bands with CORESETs are occupied, and the base station 104 skips the COT opportunity. To detect a DCI in this scenario, UE 102 can operate as illustrated in FIG. 9, for example (the NO branch of block 904, the YES branch of block 930, block 932, block 904 again, and eventually blocks 906, 920 (the YES branch), and 922).

FIGS. 15A-C schematically illustrates an example allocation 1500 of CORESETs #0- #3 within a BWP, with a WUS associated with multiple CORESETs. The base station 104 configures the time, frequency sub-bands, primary/secondary designation, and priority of the CORESETs as discussed above with reference to FIGS. 12A-C.

FIG. 15A illustrates the situation when then every sub-band is idle. The base station 104 transmits a WUS 1502 including a component 1502A on the channel corresponding to sub-band #0 and a component 1502B on the channel corresponding to sub-band #4. The components 1502A and 1502B may be identical in format and content. The base station 104 then transmits a DCI on the channels on CORESETs ##0 and 4. The base station 104 also transmits reservation signals 1504 on the unoccupied channels corresponding to sub-bands ##1-3. Referring back to FIG. 10, the UE 102 can detect and apply the DCI in accordance with the scheme of FIG. 15A at blocks 1002, 1004 (the YES branch), and 1006 of FIG. 10.

In the situation illustrated in FIG. 15B, the base station 104 determines that the sub-band of the primary CORESET #0 is occupied, and that the channels of sub-bands ##1-3 are idle. The base station 104 accordingly transmits the DCI on CORESET #3 and transmits the component 1502B of the WUS on the channel corresponding to sub-band #4. Referring again to FIG. 10, UE 102 can detect a DCI in this scenario at blocks 1006, when performing blind decoding on multiple CORESETs after detecting a WUS. Similar to FIG. 14C, FIG. 15C illustrates a scenario in which all the sub-bands with CORESETs are occupied, and the base station 104 skips the COT opportunity.

Figure 16B:
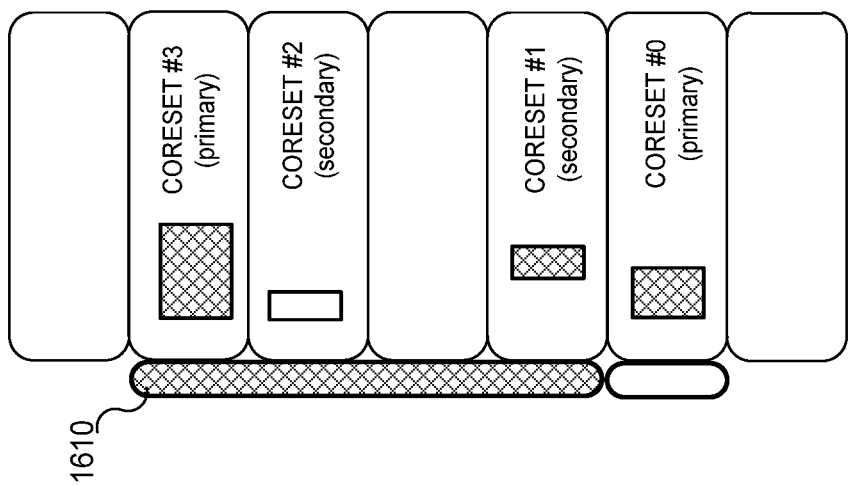
FIG. 16B illustrates a scenario in which the sub-band of the primary CORESET, allocated as illustrated in FIG. 16A, is occupied by another device.
Figure 16A:
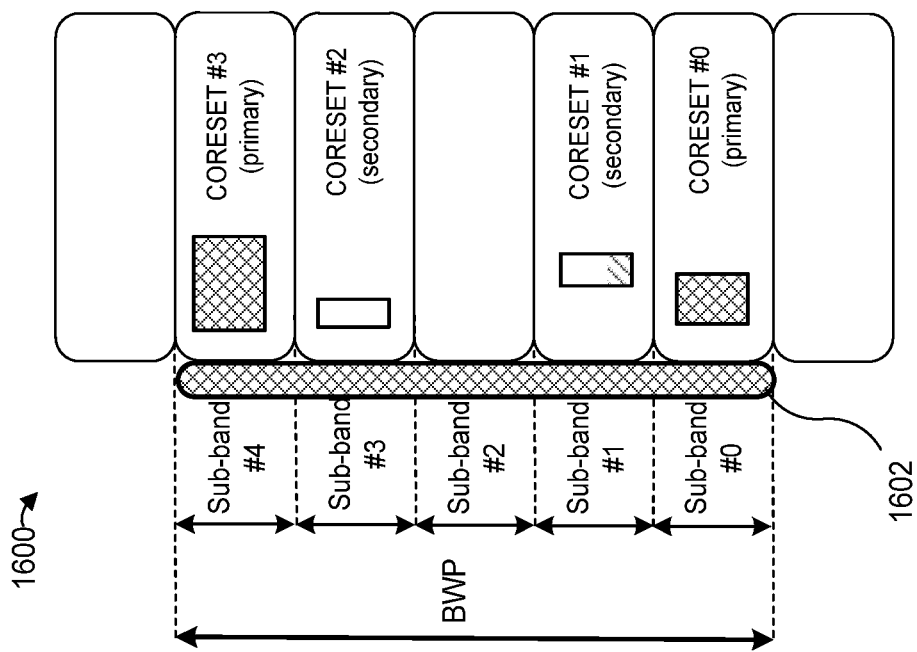
FIG. 16A schematically illustrates an example allocation of CORESETs within a BWP, with a respective WUS in each sub-band where a channel access procedure is successful, according to which the devices of FIG. 1 can operate.

FIGS. 16A-C schematically illustrates an example allocation 1600 of CORESETs #0- #3 within a BWP, with a respective WUS each sub-band where an LBT procedure is successful, i.e., where the corresponding channel is idle. The base station 104 configures the time, frequency sub-bands, primary/secondary designation, and priority of the CORESETs as discussed above with reference to FIGS. 12A-C, except that here both CORESETs ##0 and 3 are designated as primary, and CORESETs ##1 and 2 are designated as secondary.

FIG. 16A illustrates the situation when every sub-band is idle. The base station 104 transmits a WUS 1602 on each of the sub-bands ##0-4. The base station 104 then transmits a DCI on CORESET #0 or CORESET #3, designated as primary. In one implementation, the base station 104 selects CORESET #0 over CORESET #3 because of the higher priority of CORESET #0. Referring back to FIGS. 11A and 11B, the UE 102 can detect and apply the DCI in accordance with the scheme of FIG. 16A at blocks 1102, 1104 (the YES branch), and 1106; or blocks 1152, 1154 (the YES branch), and 1156.

In the situation illustrated in FIG. 16B, the base station 104 determines that the sub-band of the primary CORESET #0 is occupied, and that the channels of sub-bands ##1-3 are idle. The base station 104 transmits a WUS 1610 on each of the sub-bands ##1-4. The base station 104 then transmits a DCI on CORESET #3, which is primary. Again referring back to FIGS. 11A and 11B, the UE 102 can detect and apply the DCI in accordance with the scheme of FIG. 16B at blocks 1104, 1106, 1120, 1132, and 1134 of FIG. 11A; and blocks 1154, 1155, 1170, 1172, 1174, and 1176 of FIG. 11B. Similar to FIG. 15C, FIG. 16C illustrates a scenario in which all the sub-bands with CORESETs are occupied, and the base station 104 skips the COT opportunity.

Figure 17:
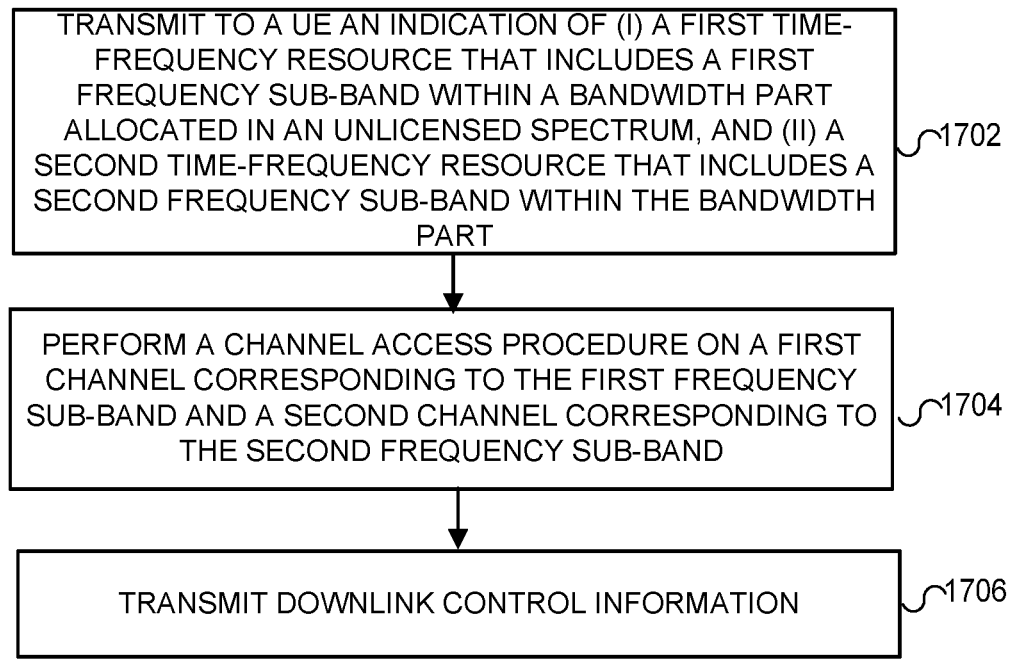
FIG. 17 is a flow diagram of an example method for allocating resources to user devices, which can be implemented in the base station of FIG. 1 or another suitable base station.

For further clarity, FIG. 17 illustrates an example method 1700 for allocating resources to user devices, which can be implemented in the base station 104 or another suitable base station.

At block 1702, a base station configures a UE with at least a first time-frequency resource and a second time-frequency resource, which can be CORESETs for example. The first time-frequency resource can include a first frequency sub-band within a BWP allocated in an unlicensed spectrum, and the second time-frequency resource can include a second frequency sub-band within a BWP allocated in the unlicensed spectrum. In some cases, the base station configures the UE with the BWP at the same time or at a different time prior to configuring the time-frequency resources. In various implementations or scenarios, the base station configures a UE with more than two (e.g., three, four) time-frequency resources. Further, the base station can apply this configuration to more than one UE.

Examples of such configurations of time-frequency resources include the CORESET configuration of FIG. 4 as well as CORESET configurations of FIGS. 12A-16C, and executing step 1702 can include executing step 502 of the method 500 or step 602 of the method 600, for example. As discussed above, configuring a UE with time-frequency resources such as CORESETs can include allocating these resources on a time-frequency resource grid in an overlapping or non-overlapping manner; designating these time-frequency resources as primary or secondary; assigning respective priorities to these time-frequency resources; and associating the time-frequency resources with separate WUS instances, shared WUS instances, or no WUS instances. As also discussed above, a base station can provide the time-resource configuration in a broadcast RRC message, a UE-specific (dedicated) RRC message, a MAC control element, etc. Further, in some cases one base station (e.g., an MgNB) can provide the configuration of time-frequency resources for use by another base station (e.g., an SgNB).

Next, at block 1704, the base station performs a channel access procedure on a first channel corresponding to the first frequency sub-band and on a second channel corresponding to the second frequency sub-band. The base station can perform the channel access procedure on the two channels in parallel (see, e.g., block 506 of FIG. 5) or sequentially (see, e.g., blocks 606 and 612 of FIG. 6). Further, as discussed above with reference to FIGS. 12A-16C, the base station in some cases performs the channel access procedure on more than two channels, in parallel or sequentially until the base station finds an idle channel.

At block 1706, the base station can transmit a DCI on a CORESET including a frequency sub-band which the base station at block 1704 identified as a part of an idle channel (see, e.g., blocks 508-518 in FIG. 5 and blocks 608-616 of FIG. 6). In some cases, as discussed above with reference to FIGS. 13A-16C, the base station transmits one or several WUS instances on the one or more channels identified as idle, prior to transmitting a DCI on the corresponding CORESET.

Figure 18:
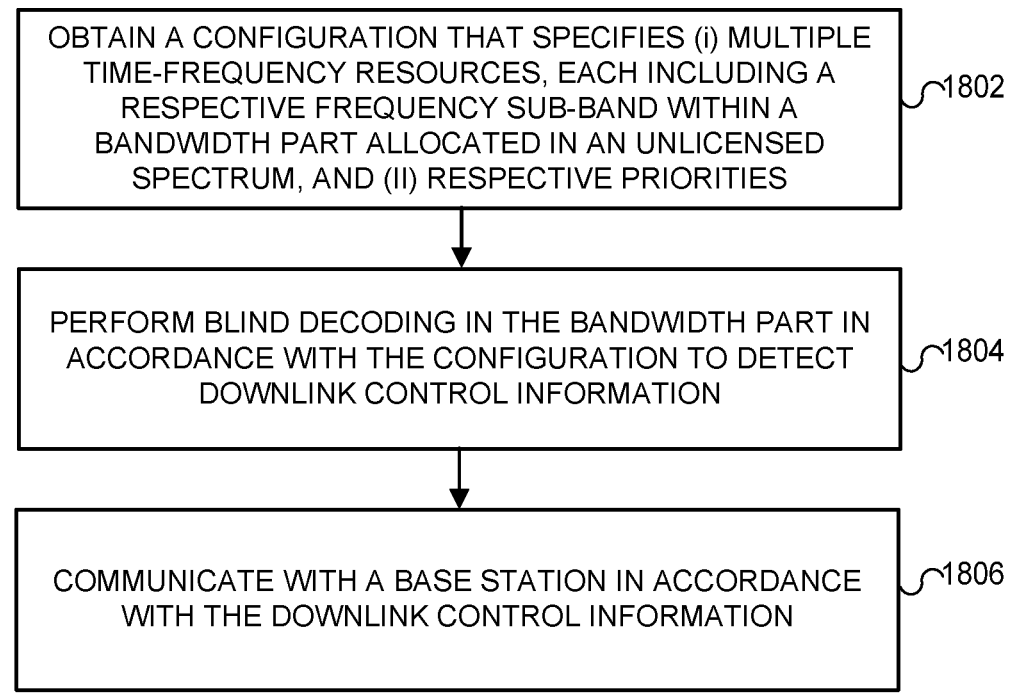
FIG. 18 is a flow diagram of an example method for obtaining resources in an unlicensed spectrum, which can be implemented in the user device of FIG. 1 of another suitable user device.

Next, FIG. 18 illustrates an example method 1800 for obtaining resources in an unlicensed spectrum, which can be implemented in the user device of FIG. 1 of another suitable user device.

At block 1802, a UE obtains a configuration that specifies multiple time-frequency resources, such as CORESET resources, each including a respective frequency sub-band within a BWP allocated in the unlicensed spectrum. The configuration also specifies respective priorities of the CORESETs and, when applicable, the corresponding WUS instances. Example configurations are discussed above with reference to FIGS. 4 and 12A-16C, block 502 of FIG. 5, block 602 of FIG. 6, and again with reference to block 1702 of FIG. 17.

At block 1804, the UE performs blinding decoding within the BWP in accordance with the configuration of time-frequency resources provided to the UE. In various implementations, the UE can perform blind decoding without first detecting a WUS (see the method 700), after detecting a single WUS (see the method 800), or detecting multiple instances of a WUS (see the methods 900, 1000, and 1100). Further, the UE can detect WUS transmissions in accordance with primary/secondary designation (see the method 1100). Still further, the UE performs blinding decoding on two or more channels in parallel, i.e., concurrently (see block 1006 of FIG. 10) or sequentially (see blocks 702 and 726 of FIG. 7, blocks 802 and 806 of FIG. 8, block 906 of FIG. 9, block 1106 of FIG. 11A, blocks 1156 and 1180 of FIG. 11B). As discussed above, the blinding decoding can include an attempt to decode the DCI using one of the RNTIs of the UE.

Next, at block 1806, the UE communicates with the base station in accordance with the DCI detected at block 1804 (if the decoding at block 1804 was successful). For example, the UE can receive PDSCH transmissions according to the DCI (see block 722 of FIG. 7, block 822 of FIG. 8, block 922 of FIG. 9, block 1022 of FIG. 10, block 1122 of FIG. 11A, block 1162 of FIG. 11B).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for support packet-based voice and video calls through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a base station for allocating resources to user devices includes transmitting, to a user device, indications of (i) a first time-frequency resource including a first frequency sub-band within a bandwidth part allocated in an unlicensed spectrum and (ii) a second time-frequency resource including a second frequency sub-band within the bandwidth part. The method further includes performing, by processing hardware, a channel access procedure on (i) a first channel corresponding to the first frequency sub-band, and (ii) a second channel corresponding to the second frequency sub-band, to obtain channel occupancy time on at least one of the first channel or the second channel; and transmitting, by the processing hardware within the obtained channel occupancy time on at least one of the first channel or the second channel, downlink control information (DCI) to a user device over a first time-frequency resource that includes the first frequency sub-band or a second time-frequency resource that includes the second frequency sub-band.

Aspect 2. The method of aspect 1, where the configuration further specifies a respective offset within a time slot for each of the first time-frequency resource and the second time-frequency resource.

Aspect 3. The method of aspect 1 or 2, including transmitting the indications in one of (i) a Radio Resource Control (RRC) message for setting up a new radio connection, (ii) an RRC message for reconfiguring a previously set up radio connection, or (iii) an RRC message for resuming a previously set up radio connection.

Aspect 4. The method of any of the preceding aspects, where the base station operates as a secondary base station, and where transmitting the indications includes transmitting the indications to the user device via a master base station.

Aspect 5. The method any of the preceding aspects, further including allocating the first time-frequency resource and the second time-frequency resource so that the first time-frequency resource and the second time-frequency resource overlap in at least time or frequency.

Aspect 6. The method of any of the preceding aspects, further including allocating the first time-frequency resource and the second time-frequency resource so that the first time-frequency resource and the second time-frequency resource overlap in neither time nor frequency.

Aspect 7. The method of any of the preceding aspects, further including assigning a first priority to the first time-frequency resource, and assigning a second priority to the second time-frequency resource, where the user device processes transmissions in the first time-frequency resource and the second time-frequency resource in accordance with the assigned priorities.

Aspect 8. The method of any of the preceding aspects, further including designating the first time-frequency resource as primary and designating the second time-frequency resource as secondary, where the user device is configured to perform blind decoding in a secondary resource only after failing to detect the DCI in each primary resource.

Aspect 9. The method of any of the preceding aspects, where performing the channel access procedure includes performing a listen-before-talk (LBT) procedure.

Aspect 10. The method of any of aspects 1-9, further including performing the channel access procedure on the first channel and the second channel concurrently.

Aspect 11. The method of any of aspects 1-9 1, further including performing the channel access procedure on the first channel and the second channel sequentially within a same time slot.

Aspect 12. The method of aspect 1, where performing the channel access procedure includes: performing the channel access procedure on the first channel, performing the channel access procedure on the second channel, in response to determining that the first channel is not idle, selecting the second channel for transmission of the downlink control information.

Aspect 13. The method of aspect 1, where the DCI is a first DCI; and where performing the channel access procedure includes: performing the channel access procedure on the first channel; performing the channel access procedure on the second channel; and in response to determining that both the first channel and the second channel are idle, transmitting the first DCI on the first frequency sub-band, and transmitting a second DCI on the second frequency sub-band.

Aspect 14. The method of any of the preceding aspects, where performing the channel access procedure includes: in response to determining that the first channel and/or the second channel is idle, transmitting a wake-up signal (WUS) on the idle channel.

Aspect 15. The method of aspect 14, further including, prior to the performing the channel access procedure: broadcasting, by the processing hardware, a configuration of the WUS in a cell in which the user device operates.

Aspect 16. The method of aspect 14, further including, prior to the performing the channel access procedure: transmitting, by the processing hardware, a format of the WUS to the user device, in a Radio Resource Control (RRC) message.

Aspect 17. The method of aspect 16, further including, prior to the performing the channel access procedure: transmitting, by the processing hardware, a Medium Access Control (MAC) element specifying a format of the WUS signal to the user device.

Aspect 18. The method of any of the preceding aspects, further including: assigning respective different priorities to each of a plurality of time-frequency resources including the first time-frequency resource and the second time-frequency resource, where the transmitting of the DCI is in accordance with the assigned priorities.

Aspect 19. The method of aspect 18, where transmitting the DCI includes: in response to determining, based on the channel access procedure, that (i) the first channel and the second channel are idle and that (ii) the assigned priority of the first channel is higher than the assigned priority of the second channel, transmitting the DCI over the first time-frequency resource and not transmitting the DCI over the second time-frequency resource.

Aspect 20. The method of aspect 18, further including: designating the first time-frequency resource as primary and designating the second time-frequency resource as secondary, where transmitting the DCI includes, in response to determining, based on the channel access procedure, that the first channel and the second channel are idle: transmitting a WUS on the first channel and transmitting the DCI over the first time-frequency resource.

Aspect 21. The method of aspect 18, further including: designating the first time-frequency resource as primary and designating the second time-frequency resource as secondary, where transmitting the DCI includes, in response to determining, based on the channel access procedure, that (i) the first channel is not idle and (ii) at least two other channels corresponding respective first frequency sub-bands within the bandwidth part are idle: not transmitting a WUS on the first channel, selecting a channel with a highest priority from among the at least two other channels, and transmitting the DCI over a time-frequency resource includes a first frequency sub-band of the selected channel.

Aspect 22. The method of aspect 21, further including transmitting a WUS on the selected channel prior to transmitting the DCI.

Aspect 23. The method of aspect 18, transmitting the DCI includes: in response to determining, based on the channel access procedure, that (i) the first channel and the second channel are idle and that (ii) several of the plurality of time-frequency resources are associated with a common WUS, transmitting the WUS on channels corresponding to the several time-frequency resources.

Aspect 24. The method of aspect 18, where transmitting the DCI includes: in response to determining, based on the channel access procedure, that the first channel and the second channel are idle, transmitting a respective WUS on the first channel and the second channel.

Aspect 25. The method of aspect 24, further comprising: designating the first time-frequency resource as primary, designating the second time-frequency resource as secondary, and transmitting the DCI over the first time-frequency resource and not transmitting the DCI over the second time-frequency resource.

Aspect 26. A base station comprising processing hardware configured to implement a method of any of the preceding aspects.

Aspect 27. A method in a user device for obtaining resources in an unlicensed spectrum includes: obtaining, by processing hardware, a configuration that specifies a plurality of time-frequency resources and respective priorities, each of the time-frequency resources including a respective frequency sub-band within a bandwidth part allocated in an unlicensed spectrum; performing, by the processing hardware, blind decoding in the bandwidth part in accordance with the configuration to detect downlink control information (DCI); and communicating with a base station in accordance with the detected DCI.

Aspect 28. The method of aspect 27, where performing the blind decoding includes: performing blind decoding on a first one of the plurality of time-frequency resources having a first priority, and in response to failing to detect the DCI on the first one of the plurality time-frequency resources, performing blind decoding on a second one of the plurality of time-frequency resources having a second priority lower than the first priority.

Aspect 29. The method of aspect 28, where the configuration includes three or more time-frequency resources, and wherein performing the blind decoding further includes: in response to detecting the DCI on the second one of the plurality of time-frequency resources, completing the blind decoding and selecting the detected DCI for communicating with the base station.

Aspect 30. The method of aspect 28 or 29, where performing blind decoding on the first one and the second one of the plurality of time-frequency resources is in response to detecting a single wake-up signal (WUS).

Aspect 31. The method of aspect 28 or 29, further including: performing blind decoding on each of the plurality of time-frequency resources in response to detecting a respective WUS.

Aspect 32. The method of aspect 28 or 29, where: performing blind decoding on two or more of the plurality of time-frequency resources in response to detecting a first WUS; and performing blind decoding on at least another one of the plurality of time-frequency resources in response to detecting a second WUS.

Aspect 33. The method of aspect 27-32, where performing the blind decoding includes performing blind decoding on two or more of the plurality of time-frequency resources concurrently.

Aspect 34. The method of aspect 27-33, where performing the blind decoding includes: performing blind decoding on the two or more of the plurality of time-frequency resources in response to detecting a first WUS; and performing blind decoding on at least one other of the plurality of time-frequency resources in response to detecting a second WUS.

Aspect 35. The method of aspect 27-34, where: the obtained configuration further indicates, for each of the plurality of time-frequency resources, whether the time-frequency resource is primary or secondary, the first WUS corresponds to primary time-frequency resources, and the second WUS corresponds to secondary time-frequency resources.

Aspect 36. The method of aspect 27-35, where the obtained configuration further indicates, for each of the plurality of time-frequency resources, whether the time-frequency resource is primary or secondary, and wherein performing the blind decoding includes: performing blind decoding on a secondary time-frequency resource only after failing to detect the DCI in each of one or more primary time-frequency resources in the plurality of time-frequency resources.

Aspect 37. The method according to any of the aspects 27-36, where performing the blind decoding includes detecting the DCI that includes an identifier of the user device.

Aspect 38. The method according to any of the aspects 27-37, where communicating with the base station in accordance with the detected DCI includes receiving a Physical Downlink Shared Channel (PDSCH) transmission.

Aspect 39. The method according to any of the aspects 27-37, where communicating with the base station in accordance with the detected DCI includes receiving a Physical Downlink Channel (PDCCH) transmission.

Aspect 40. A user device including processing hardware configured to implement a method of any of aspects 27-39.

What is claimed is:

1. A method in a base station for allocating resources to user devices, the method comprising:
   transmitting, to a user device, indications of (i) a first time-frequency resource including a first frequency sub-band within a bandwidth part (BWP) allocated in an unlicensed spectrum and (ii) a second time-frequency resource including a second frequency sub-band within the BWP;
   performing a channel access procedure on (i) a first channel corresponding to the first frequency sub-band, and (ii) a second channel corresponding to the second frequency sub-band, to obtain channel occupancy time on the first channel and the second channel;
   transmitting, within the obtained channel occupancy time on the first channel, a first downlink control information (DCI) to the user device over a first time-frequency resource that includes the first frequency sub-band; and
   transmitting within the obtained channel occupancy time on the second channel, a second DCI to the user device over a second time-frequency resource that includes the second frequency sub-band.

2. The method of claim 1, wherein the configuration further specifies a respective offset within a time slot for each of the first time-frequency resource and the second time-frequency resource.

3. The method of claim 1, including:
   transmitting the indications in one of (i) a Radio Resource Control (RRC) message for setting up a new radio connection, (ii) an RRC message for reconfiguring a previously set up radio connection, or (iii) an RRC message for resuming a previously set up radio connection.

4. The method of claim 1, wherein performing the channel access procedure includes:
   performing the channel access procedure on the first channel;
   performing the channel access procedure on the second channel; and
   in response to determining that both the first channel and the second channel are idle:
   transmitting the first DCI on the first frequency sub-band, and
   transmitting the second DCI on the second frequency sub-band.

5. The method of claim 1, wherein performing the channel access procedure includes:
   in response to determining that the first channel is idle, transmitting a wake-up signal (WUS) on the first channel, and
   in response to determining that the second channel is idle, transmitting a WUS on the second channel.

6. The method of claim 5, further including, prior to the performing the channel access procedure:
   broadcasting a configuration of the WUS in a cell in which the user device operates.

7. The method of claim 5, further including, prior to the performing the channel access procedure:
   transmitting a format of the WUS to the user device, in a Radio Resource Control (RRC) message.

8. The method of claim 5, further including, prior to the performing the channel access procedure:
   transmitting a Medium Access Control (MAC) element specifying a format of the WUS to the user device.

9. The method of claim 5, further comprising:
   allocating the first time-frequency resource and the second time-frequency resource so that the first time-frequency resource and the second time-frequency resource overlap in at least time or frequency.

10. The method of claim 5, further comprising:
    allocating the first time-frequency resource and the second time-frequency resource so that the first time-frequency resource and the second time-frequency resource overlap in neither time nor frequency.

11. A base station comprising:
    a processing hardware; and
    a non-transitory computer-readable medium storing thereon instructions which, when executed by the processing hardware, cause the base station to:
    transmit, to a user device, indications of (i) a first time-frequency resource including a first frequency sub-band within a bandwidth part (BWP) allocated in an unlicensed spectrum and (ii) a second time-frequency resource including a second frequency sub-band within the BWP;
    perform a channel access procedure on (i) a first channel corresponding to the first frequency sub-band, and (ii) a second channel corresponding to the second frequency sub-band, to obtain channel occupancy time on the first channel and the second channel;
    transmit, within the obtained channel occupancy time on the first channel, a first downlink control information (DCI) to the user device over a first time-frequency resource that includes the first frequency sub-band; and
    transmit, within the obtained channel occupancy time on the second channel, a second DCI to the user device over a second time-frequency resource that includes the second frequency sub-band.

12. The base station of claim 11, wherein the configuration further specifies a respective offset within a time slot for each of the first time-frequency resource and the second time-frequency resource.

13. The base station of claim 11, wherein the instructions further cause the base station to:
    transmit the indications in one of (i) a Radio Resource Control (RRC) message for setting up a new radio connection, (ii) an RRC message for reconfiguring a previously set up radio connection, or (iii) an RRC message for resuming a previously set up radio connection.

14. The base station of claim 11, wherein to perform the channel access procedure, the instructions cause the base station to:
    perform the channel access procedure on the first channel;
    perform the channel access procedure on the second channel; and
    in response to determining that both the first channel and the second channel are idle:
    transmit the first DCI on the first frequency sub-band, and
    transmit the second DCI on the second frequency sub-band.

15. The base station of claim 11, wherein to perform the channel access procedure, the instructions cause the base station to:
    in response to determining that the first channel is idle, transmit a wake-up signal (WUS) on the first channel, and
    in response to determining that the second channel is idle, transmit a WUS on the second channel.

16. The base station of claim 15, wherein the instructions further cause the base station, prior to the performing the channel access procedure, to:
    broadcast a configuration of the WUS in a cell in which the user device operates.

17. The base station of claim 15, wherein the instructions further cause the base station, prior to the performing the channel access procedure:
    transmit a format of the WUS to the user device, in a Radio Resource Control (RRC) message.

18. The base station of claim 15, wherein the instructions further cause the base station, prior to the performing the channel access procedure:
    transmit a Medium Access Control (MAC) element specifying a format of the WUS to the user device.

19. The base station of claim 15, wherein the instructions further cause the base station to:
    allocate the first time-frequency resource and the second time-frequency resource so that the first time-frequency resource and the second time-frequency resource overlap in at least time or frequency.

20. The base station of claim 15, wherein the instructions further cause the base station to:
    allocate the first time-frequency resource and the second time-frequency resource so that the first time-frequency resource and the second time-frequency resource overlap in neither time nor frequency.

* * * * *